United States Patent
Nielsen et al.

(10) Patent No.: US 8,340,359 B2
(45) Date of Patent: Dec. 25, 2012

(54) ELECTRONIC MANIFEST OF UNDERGROUND FACILITY LOCATE MARKS

(75) Inventors: Steven Nielsen, North Palm Beach, FL (US); Curtis Chambers, Palm Beach Gardens, FL (US)

(73) Assignee: Certusview Technologies, LLC, Palm Beach Gardens, FL (US)

( * ) Notice: Subject to any disclaimer, the term of this patent is extended or adjusted under 35 U.S.C. 154(b) by 837 days.

(21) Appl. No.: 12/208,846

(22) Filed: Sep. 11, 2008

(65) Prior Publication Data

US 2009/0202110 A1 Aug. 13, 2009

Related U.S. Application Data

(63) Continuation of application No. 12/029,732, filed on Feb. 12, 2008.

(51) Int. Cl.
*G06K 9/00* (2006.01)
*G09G 5/00* (2006.01)

(52) U.S. Cl. ......... 382/113; 382/100; 345/619; 345/629

(58) Field of Classification Search .................... 382/113
See application file for complete search history.

(56) References Cited

U.S. PATENT DOCUMENTS

| | | | |
|---|---|---|---|
| 4,623,282 A | 11/1986 | Allen | |
| 5,414,462 A | 5/1995 | Veatch | |
| 5,576,973 A | 11/1996 | Haddy | |
| 5,644,237 A | 7/1997 | Eslambolchi et al. | |
| 5,699,244 A | 12/1997 | Clark, Jr. | |
| 5,815,411 A | 9/1998 | Ellenby | |
| 5,920,194 A | 7/1999 | Lewis et al. | |
| 5,987,380 A | 11/1999 | Backman | |
| 6,101,087 A | 8/2000 | Sutton | |
| 6,127,827 A | 10/2000 | Lewis | |
| 6,195,922 B1 | 3/2001 | Stump | |
| 6,201,883 B1 | 3/2001 | Miziu | |
| 6,299,934 B1 | 10/2001 | Manning | |
| 6,351,707 B1 | 2/2002 | Ichikawa | |
| 6,426,872 B1 | 7/2002 | Sutton | |
| 6,430,499 B1 | 8/2002 | Nakano | |
| 6,437,708 B1 | 8/2002 | Brouwer | |
| 6,477,475 B1 | 11/2002 | Takaoka et al. | |
| 6,493,650 B1 | 12/2002 | Rodgers | |
| 6,650,293 B1 | 11/2003 | Eslambolchi | |
| 6,710,741 B2 | 3/2004 | Tucker | |

(Continued)

FOREIGN PATENT DOCUMENTS

CA 2386200 4/2001

(Continued)

OTHER PUBLICATIONS

Common Ground Alliance, Best Practices Version 1.0, Apr. 2003.

(Continued)

*Primary Examiner* — Bhavesh Mehta
*Assistant Examiner* — Nirav G Patel
(74) *Attorney, Agent, or Firm* — Foley & Lardner LLP; Joseph Teja, Jr.

(57) ABSTRACT

A manifest including an electronic file associated with a geographic location and a portion of the geographic location indicating a dig area is provided. The manifest includes indicia noting a presence or an absence of at least one underground facility within the dig area.

30 Claims, 8 Drawing Sheets

U.S. PATENT DOCUMENTS

| | | |
|---|---|---|
| 6,723,375 B2 | 4/2004 | Zeck et al. |
| 6,751,552 B1 | 6/2004 | Minelli |
| 6,751,553 B2 | 6/2004 | Young |
| 6,751,554 B1 | 6/2004 | Asher et al. |
| 6,772,142 B1 | 8/2004 | Kelling et al. |
| 6,778,128 B2 | 8/2004 | Tucker et al. |
| 6,853,905 B2 | 2/2005 | Barton |
| 6,873,998 B1 | 3/2005 | Dorum |
| 6,895,356 B2 | 5/2005 | Brimhall |
| 6,898,525 B1 | 5/2005 | Minelli |
| 6,904,361 B1 | 6/2005 | Tallman et al. |
| 6,950,535 B2 | 9/2005 | Sibayama |
| 6,956,524 B2 | 10/2005 | Tucker et al. |
| 6,958,690 B1 | 10/2005 | Asher et al. |
| 6,972,698 B2 | 12/2005 | Deguchi |
| 6,999,021 B2 | 2/2006 | Taylor, Jr. |
| 7,003,138 B2 | 2/2006 | Wilson |
| 7,009,399 B2 | 3/2006 | Olsson et al. |
| 7,027,653 B2 | 4/2006 | Hino |
| 7,120,564 B2 | 10/2006 | Pacey |
| 7,142,196 B1 | 11/2006 | Connor |
| 7,185,021 B2 | 2/2007 | Kishigami |
| 7,216,034 B2 | 5/2007 | Vitikainen |
| 7,262,797 B2 | 8/2007 | Weldum |
| 7,372,247 B1 * | 5/2008 | Giusti et al. ............ 324/67 |
| 7,400,976 B2 | 7/2008 | Young et al. |
| 7,417,641 B1 | 8/2008 | Barber |
| 7,437,830 B1 | 10/2008 | Kulavic |
| 7,469,247 B2 | 12/2008 | Cossins et al. |
| 7,584,123 B1 | 9/2009 | Karonis et al. |
| 7,613,331 B2 | 11/2009 | Maeda |
| 7,626,496 B1 | 12/2009 | Asher et al. |
| 7,636,901 B2 | 12/2009 | Munson |
| 7,640,105 B2 | 12/2009 | Nielsen et al. |
| 7,664,530 B2 | 2/2010 | Skelton |
| 7,773,095 B1 | 8/2010 | Badrak et al. |
| 7,777,648 B2 | 8/2010 | Smith et al. |
| 7,889,888 B2 | 2/2011 | Deardorr |
| 7,978,129 B2 | 7/2011 | Sawyer et al. |
| 8,045,995 B2 | 10/2011 | King |
| 2001/0036295 A1 | 11/2001 | Hendrickson |
| 2002/0013704 A1 * | 1/2002 | Finney .................. 704/246 |
| 2002/0052755 A1 | 5/2002 | Whatley |
| 2002/0184235 A1 | 12/2002 | Young |
| 2003/0012411 A1 | 1/2003 | Sjostrom |
| 2003/0164053 A1 * | 9/2003 | Ignagni .................. 73/866.5 |
| 2004/0006425 A1 | 1/2004 | Wood |
| 2004/0073578 A1 | 4/2004 | Nam |
| 2004/0146185 A1 * | 7/2004 | Blair et al. ............ 382/113 |
| 2004/0151388 A1 | 8/2004 | Maeda |
| 2004/0203909 A1 | 10/2004 | Koster |
| 2004/0210370 A1 | 10/2004 | Gudat |
| 2004/0210386 A1 | 10/2004 | Wood |
| 2005/0033513 A1 | 2/2005 | Gasbarro |
| 2005/0034074 A1 | 2/2005 | Munson |
| 2005/0046584 A1 | 3/2005 | Breed |
| 2005/0057745 A1 | 3/2005 | Bontje |
| 2005/0125389 A1 | 6/2005 | Hazzard et al. |
| 2005/0192752 A1 | 9/2005 | Rooney |
| 2005/0203768 A1 | 9/2005 | Florance |
| 2005/0219268 A1 | 10/2005 | Kyle |
| 2006/0020417 A1 | 1/2006 | Koch et al. |
| 2006/0058945 A1 | 3/2006 | Watanabe |
| 2006/0077095 A1 | 4/2006 | Tucker et al. |
| 2006/0085396 A1 * | 4/2006 | Evans et al. ............ 707/3 |
| 2006/0161349 A1 | 7/2006 | Cross |
| 2006/0229809 A1 | 10/2006 | Chen |
| 2006/0282280 A1 * | 12/2006 | Stotz et al. ............ 705/1 |
| 2007/0027591 A1 | 2/2007 | Goldenberg |
| 2007/0076920 A1 | 4/2007 | Ofek |
| 2007/0100768 A1 | 5/2007 | Boccon-Gibod et al. |
| 2007/0143676 A1 | 6/2007 | Chen |
| 2007/0182721 A1 | 8/2007 | Watanabe et al. |
| 2007/0187574 A1 | 8/2007 | Lia |
| 2007/0219722 A1 | 9/2007 | Sawyer, Jr. |
| 2008/0021863 A1 | 1/2008 | Evans |
| 2008/0059889 A1 | 3/2008 | Parker et al. |
| 2008/0109751 A1 | 5/2008 | Fitzmaurice et al. |
| 2008/0125942 A1 | 5/2008 | Tucker et al. |
| 2008/0245299 A1 | 10/2008 | Nielsen et al. |
| 2008/0288267 A1 | 11/2008 | Asher |
| 2009/0013806 A1 | 1/2009 | Miller et al. |
| 2009/0013928 A1 | 1/2009 | Nielsen et al. |
| 2009/0070071 A1 | 3/2009 | Wood |
| 2009/0100185 A1 | 4/2009 | Shehan et al. |
| 2009/0121937 A1 | 5/2009 | Kaegebein |
| 2009/0201178 A1 | 8/2009 | Nielsen et al. |
| 2009/0201311 A1 | 8/2009 | Nielsen et al. |
| 2009/0202101 A1 | 8/2009 | Nielsen et al. |
| 2009/0202110 A1 | 8/2009 | Nielsen et al. |
| 2009/0202111 A1 | 8/2009 | Nielsen et al. |
| 2009/0202112 A1 | 8/2009 | Nielsen et al. |
| 2009/0204238 A1 | 8/2009 | Nielsen et al. |
| 2009/0204466 A1 | 8/2009 | Nielsen et al. |
| 2009/0204625 A1 | 8/2009 | Nielsen et al. |
| 2009/0207019 A1 | 8/2009 | Nielsen et al. |
| 2009/0208642 A1 | 8/2009 | Nielsen et al. |
| 2009/0210098 A1 | 8/2009 | Nielsen et al. |
| 2009/0210284 A1 | 8/2009 | Nielsen et al. |
| 2009/0210285 A1 | 8/2009 | Nielsen et al. |
| 2009/0210297 A1 | 8/2009 | Nielsen et al. |
| 2009/0210298 A1 | 8/2009 | Nielsen et al. |
| 2009/0237408 A1 | 9/2009 | Nielsen et al. |
| 2009/0238414 A1 | 9/2009 | Nielsen et al. |
| 2009/0238415 A1 | 9/2009 | Nielsen et al. |
| 2009/0238416 A1 | 9/2009 | Nielsen et al. |
| 2009/0238417 A1 | 9/2009 | Nielsen et al. |
| 2009/0241045 A1 | 9/2009 | Nielsen et al. |
| 2009/0324815 A1 | 12/2009 | Nielsen et al. |
| 2009/0327024 A1 | 12/2009 | Nielsen et al. |
| 2010/0006667 A1 | 1/2010 | Nielsen et al. |
| 2010/0010862 A1 | 1/2010 | Nielsen et al. |
| 2010/0010863 A1 | 1/2010 | Nielsen et al. |
| 2010/0010882 A1 | 1/2010 | Nielsen et al. |
| 2010/0010883 A1 | 1/2010 | Nielsen et al. |
| 2010/0084532 A1 | 4/2010 | Nielsen et al. |
| 2010/0085054 A1 | 4/2010 | Nielsen et al. |
| 2010/0085185 A1 | 4/2010 | Nielsen et al. |
| 2010/0085376 A1 | 4/2010 | Nielsen et al. |
| 2010/0085694 A1 | 4/2010 | Nielsen et al. |
| 2010/0085701 A1 | 4/2010 | Nielsen et al. |
| 2010/0086671 A1 | 4/2010 | Nielsen et al. |
| 2010/0086677 A1 | 4/2010 | Nielsen et al. |
| 2010/0088031 A1 | 4/2010 | Nielsen et al. |
| 2010/0088032 A1 | 4/2010 | Nielsen et al. |
| 2010/0088134 A1 | 4/2010 | Nielsen et al. |
| 2010/0088135 A1 | 4/2010 | Nielsen et al. |
| 2010/0088164 A1 | 4/2010 | Nielsen et al. |
| 2010/0090700 A1 | 4/2010 | Nielsen et al. |
| 2010/0090858 A1 | 4/2010 | Nielsen et al. |
| 2010/0094553 A1 | 4/2010 | Nielsen et al. |
| 2010/0117654 A1 | 5/2010 | Nielsen et al. |
| 2010/0188088 A1 | 7/2010 | Nielsen et al. |
| 2010/0188215 A1 | 7/2010 | Nielsen et al. |
| 2010/0188216 A1 | 7/2010 | Nielsen et al. |
| 2010/0188245 A1 | 7/2010 | Nielsen et al. |
| 2010/0188407 A1 | 7/2010 | Nielsen et al. |
| 2010/0189312 A1 | 7/2010 | Nielsen et al. |
| 2010/0189887 A1 | 7/2010 | Nielsen et al. |
| 2010/0198663 A1 | 8/2010 | Nielsen et al. |
| 2010/0201690 A1 | 8/2010 | Nielsen et al. |
| 2010/0201706 A1 | 8/2010 | Nielsen et al. |
| 2010/0205031 A1 | 8/2010 | Nielsen et al. |
| 2010/0205032 A1 | 8/2010 | Nielsen et al. |
| 2010/0205195 A1 | 8/2010 | Nielsen et al. |
| 2010/0205264 A1 | 8/2010 | Nielsen et al. |
| 2010/0205536 A1 | 8/2010 | Nielsen et al. |
| 2010/0205554 A1 | 8/2010 | Nielsen et al. |
| 2010/0205555 A1 | 8/2010 | Nielsen et al. |
| 2010/0228588 A1 | 9/2010 | Nielsen et al. |
| 2010/0241046 A1 | 9/2010 | Nielsen et al. |
| 2010/0245086 A1 | 9/2010 | Nielsen et al. |
| 2010/0247754 A1 | 9/2010 | Nielsen et al. |
| 2010/0253511 A1 | 10/2010 | Nielsen et al. |
| 2010/0253513 A1 | 10/2010 | Nielsen et al. |
| 2010/0253514 A1 | 10/2010 | Nielsen et al. |
| 2010/0255182 A1 | 10/2010 | Nielsen et al. |

| | | |
|---|---|---|
| 2010/0256825 A1 | 10/2010 | Nielsen et al. |
| 2010/0256863 A1 | 10/2010 | Nielsen et al. |
| 2010/0256912 A1 | 10/2010 | Nielsen et al. |
| 2010/0256981 A1 | 10/2010 | Nielsen et al. |
| 2010/0257029 A1 | 10/2010 | Nielsen et al. |
| 2010/0257477 A1 | 10/2010 | Nielsen et al. |
| 2010/0259381 A1 | 10/2010 | Nielsen et al. |
| 2010/0259414 A1 | 10/2010 | Nielsen et al. |
| 2010/0262470 A1 | 10/2010 | Nielsen et al. |
| 2010/0262670 A1 | 10/2010 | Nielsen et al. |
| 2010/0263591 A1 | 10/2010 | Nielsen et al. |
| 2010/0268786 A1 | 10/2010 | Nielsen et al. |
| 2010/0272885 A1 | 10/2010 | Olsson |
| 2010/0285211 A1 | 11/2010 | Nielsen et al. |
| 2010/0318401 A1 | 12/2010 | Nielsen et al. |
| 2010/0318402 A1 | 12/2010 | Nielsen et al. |
| 2010/0318465 A1 | 12/2010 | Nielsen et al. |
| 2010/0324967 A1 | 12/2010 | Nielsen et al. |
| 2011/0006772 A1 | 1/2011 | Olsson et al. |
| 2011/0007076 A1 | 1/2011 | Nielsen et al. |
| 2011/0020776 A1 | 1/2011 | Nielsen et al. |
| 2011/0022433 A1 | 1/2011 | Nielsen et al. |
| 2011/0035245 A1 | 2/2011 | Nielsen et al. |
| 2011/0035251 A1 | 2/2011 | Nielsen et al. |
| 2011/0035252 A1 | 2/2011 | Nielsen et al. |
| 2011/0035260 A1 | 2/2011 | Nielsen et al. |
| 2011/0035324 A1 | 2/2011 | Nielsen et al. |
| 2011/0035328 A1 | 2/2011 | Nielsen et al. |
| 2011/0040589 A1 | 2/2011 | Nielsen et al. |
| 2011/0040590 A1 | 2/2011 | Nielsen et al. |
| 2011/0045175 A1 | 2/2011 | Nielsen et al. |
| 2011/0046993 A1 | 2/2011 | Nielsen et al. |
| 2011/0046994 A1 | 2/2011 | Nielsen et al. |
| 2011/0046999 A1 | 2/2011 | Nielsen et al. |
| 2011/0060496 A1 | 3/2011 | Nielsen et al. |
| 2011/0060549 A1 | 3/2011 | Nielsen et al. |
| 2011/0095885 A9 | 4/2011 | Nielsen et al. |
| 2011/0131081 A1 | 6/2011 | Nielsen et al. |
| 2011/0135163 A1 | 6/2011 | Nielsen et al. |
| 2011/0137769 A1 | 6/2011 | Nielsen et al. |
| 2011/0236588 A1 | 9/2011 | Nielsen et al. |
| 2011/0240936 A1 | 10/2011 | Sawyer, Jr. et al. |
| 2011/0241936 A1* | 10/2011 | Sawyer et al. ........... 342/357.48 |
| 2011/0279229 A1 | 11/2011 | Nielsen et al. |
| 2011/0279230 A1 | 11/2011 | Nielsen et al. |
| 2011/0279476 A1 | 11/2011 | Nielsen et al. |
| 2011/0282542 A9 | 11/2011 | Nielsen et al. |
| 2011/0283217 A1 | 11/2011 | Nielsen et al. |
| 2011/0285749 A1 | 11/2011 | Nielsen et al. |
| 2012/0019380 A1 | 1/2012 | Nielsen et al. |
| 2012/0036140 A1 | 2/2012 | Nielsen et al. |
| 2012/0065924 A1 | 3/2012 | Nielsen et al. |
| 2012/0065944 A1 | 3/2012 | Nielsen et al. |
| 2012/0066137 A1 | 3/2012 | Nielsen et al. |
| 2012/0066273 A1 | 3/2012 | Nielsen et al. |
| 2012/0066506 A1 | 3/2012 | Nielsen et al. |
| 2012/0069178 A1 | 3/2012 | Nielsen et al. |
| 2012/0072035 A1 | 3/2012 | Nielsen et al. |
| 2012/0110019 A1 | 5/2012 | Nielsen et al. |
| 2012/0113244 A1 | 5/2012 | Nielsen et al. |

FOREIGN PATENT DOCUMENTS

| | | |
|---|---|---|
| CA | 2528795 | 6/2007 |
| WO | WO-02/067083 | 8/2002 |

OTHER PUBLICATIONS

Common Ground, Study of One-Call Systems and Damage Prevention Best Practices, Aug. 1999.
Co-Pending U.S. Appl. No. 12/029,732, filed Feb. 12, 2008.
Co-Pending U.S. Appl. No. 12/363,009, filed Jan. 30, 2009.
Co-Pending U.S. Appl. No. 12/363,046, filed Jan. 30, 2009.
Co-Pending U.S. Appl. No. 12/366,050, filed Feb. 5, 2009.
Co-Pending U.S. Appl. No. 12/369,232, filed Feb. 11, 2009.
Co-Pending U.S. Appl. No. 12/369,565, filed Feb. 11, 2009.
Pevarski, R., Virginia Pilot Project: Technology Meets Damage Prevention, http://www.excavationsafetyonline.com/esg/guidePDFs/2009_2009_ESG_Page_9.pdf, printed on Nov. 3, 2009.
Virginia Pilot Project, Incorporating GPS Technology to Enhance One-Call Damage Prevention, Phase I—Electronic White Lining Project Report, Nov. 2007, 50 pages.
Doyle, K., UGI Utilities: Delivering enhanced service, Energy Digital, http://www.energydigital.com/company-report/ugi-utilities-delivering-enhanced-service (original publication date unknown), retrieved Aug. 1, 2011, 3 pages.
GPS Technology Enhancing Underground Utility Locating, Underground Construction Magazine, Apr. 7, 2010, 4 pages, http://www.undergroundconstructionmagazine.com/print/1034?page=show.
InMaps Develops Critical Database Link to Keep UGI Automation on Track, Holderness, NH, Sep. 2006, http://www.inmaps.com/InMaps-develops-critical-database-link-to-keep-ugi-automation-on-track, 1 page.
International Search Report and Written Opinion, Application Serial No. PCT/US2009/000859, Apr. 14, 2009.
International Search Report, Application Serial No. PCT/US10/041160, Oct. 6, 2010.
Letter from Norfield Data Products to Wolf Greenfield & Sacks, P.C., May 5, 2010, 2 pages.
Office Action dated Jul. 13, 2011 from U.S. Appl. No. 12/029,732, filed Feb. 12, 2008.
One Call Concepts Locating Services, Inc., Point Positive Utility Mapping & GIS, http://www.occls.com/Default.aspx?content=pointpositive, original publication date unknown, retrieved Sep. 21, 2011, 1 page.
UGI Utilities Selects KEMA for FLAME Project Implementation, Burlington, Massachusetts, Electric Energy Publications, Inc., Feb. 10, 2004, http://www.eet-d.com/?page=show_news&id=17641, 2 pages.
UGI Utilities, Inc., FLAME Project White Paper, (original publication date unknown), received Aug. 3, 2011, 12 pages.
Notice of Allowance dated Dec. 13, 2011 from U.S. Appl. No. 12/369,565.
Office Action dated Jan. 20, 2012 from U.S. Appl. No. 13/190,138.
Notice of Allowance dated Oct. 6, 2011 from CA Application No. 2,715,312.
Office Action dated Oct. 4, 2011 from Canadian Application No. 2,707,246.
Office Action dated Oct. 6, 2011 from U.S. Appl. No. 12/366,050.
U.S. Appl. No. 12/831,330, filed Jul. 7, 2010, Nielsen et al.
U.S. Appl. No. 13/190,138, filed Jul. 25, 2011, Nielsen et al.
U.S. Appl. No. 13/190,185, filed Jul. 25, 2011, Nielsen et al.
U.S. Appl. No. 13/191,048, filed Jul. 26, 2011, Nielsen et al.
U.S. Appl. No. 13/191,058, filed Jul. 26, 2011, Nielsen et al.
U.S. Appl. No. 13/194,121, filed Jul. 29, 2011, Nielsen et al.
U.S. Appl. No. 13/194,163, filed Jul. 29, 2011, Nielsen et al.
U.S. Appl. No. 13/193,337, filed Jul. 28, 2011, Nielsen et al.
U.S. Appl. No. 13/185,194, filed Jul. 18, 2011, Nielsen et al.
Stahovich, David M. et al., "Automated and Integrated Call Before You Dig," Proceedings of GITA 2005, GITA's 18th Annual Conference, Mar. 6-9, 2005, Denver, CO. online: GIS for Oil & Gas Conference 2002 http://www.gisdevelopment.net/proceedings/gita/2005/papers/76.pdf.
Office Action dated Nov. 23, 2011 from U.S. Appl. No. 12/208,846.
Office Action dated Nov. 23, 2011 from U.S. Appl. No. 12/363,009.
Office Action dated Nov. 26, 2010 from Australian Application No. 2009213151.
Office Action dated Nov. 29, 2011 from Australian Application No. 2009213151.
Office Action dated Feb. 16. 2012 from U.S. Appl. No. 12/369,232.
Office Action dated Feb. 29, 2012 from U.S. Appl. No. 12/833,117.
Office Action dated Mar. 2, 2012 from U.S. Appl. No. 12/831,330.
Office Action dated Mar. 8, 2012 from U.S. Appl. No. 13/190,185.
Heath, M. et al., "Comparison of Edge Detectors: A Methodology and Initial Study," 1996, IEEE Computer Society Press; http://citeseerx.ist.psu.edu/viewdoc/summary?doi=10.1.45.5214.
Office Action dated Apr. 5, 2012 from U.S. Appl. No. 13/191,048.
Office Action dated Apr. 6, 2012 from U.S. Appl. No. 13/191,058.
Office Action dated Apr. 11, 2012 from U.S. Appl. No. 12/029,732.
Office Action dated Apr. 17, 2012 from U.S. Appl. No. 12/607,843.
Office Action dated Apr. 23, 2012 from U.S. Appl. No. 12/366,050.
Office Action dated Apr. 25, 2012 from U.S. Appl. No. 12/363,046.

Office Action dated May 1, 2012 from U.S. Appl. No. 12/363,009.
Office Action dated May 7, 2012 from U.S. Appl. No. 13/193,337.
Office Action dated May 24, 2012 from U.S. Appl. No. 13/190,138.
Office Action dated May 24, 2012 from U.S. Appl. No. 13/194,121.
Office Action dated Jun. 8, 2012 from U.S. Appl. No. 13/194,163.
Office Action dated Jun. 28, 2012 from U.S. Appl. No. 12/369,565.
Ross, C., "2d Tile Map Editor," Oct. 19, 2005; http://www.blitzbasic.com/Community/posts.php?topic=52152, pp. 1-3.
w3schools; "JavaScript Pop Up Boxes," Aug. 11, 2005; http://www.w3schools.com/js/js_popup.asp, pp. 1-2.
U.S. Appl. No. 13/625,436, Filed Sep. 24, 2012, Nielsen et al.
ArcFM, White Paper, 2006, 1-28.
ArcGIS 9, Geocoding in ArcGIS, Manual, 2004, 1-192.
ArcPad, Mobile GIS Software for Field Mapping Applications, brochure, 2006, http:/www.esri.com/library/brochures/pdfs/arcpadbro.pdf.
ArcPad: Mobile GIS, ESRI White Paper, Sep. 2004, 1-17, http://www.esri.com/library/whitepapers/pdfs/arcpad.pdf.
Corrected Notice of Allowability dated Aug. 21, 2012 from U.S. Appl. No. 12/369,565.
DigiTerra Explorer, brochure, v. 6, 2009, 1-2.
DigiTerra Explorer, User Manual, v. 5, 2007, 1-64.
MobileMapper 6 vs. Juno SC in Real World Conditions, White Paper, 2009 1-16, http://www.sidwellco.com/php/gps_solutions/docs/MM6_vs_Juno_WP_en.pdf.
MobileMapper 6, brochure, 2008, 1-4.
Notice of Allowance dated Aug. 21, 2012 from U.S. Appl. No. 12/369,232.
Office Action dated Jul. 26, 2012 from Canadian Application No. 2,707,246.
Office Action dated Aug. 7, 2012 from U.S. Appl. No. 13/190,185.
Office Action dated Aug. 9, 2012 from U.S. Appl. No. 12/831,330.
Supplemental Notice of Allowance dated Jul. 27, 2012 from U.S. Appl. No. 12/366,050.
Trimble Comprehensive Utilities, brochure, 2010, 1-6.
Notice of Allowance dated Jul. 11, 2012 from U.S. Appl. No. 12/366,050.
Office Action dated Jul. 17, 2012 from U.S. Appl. No. 12/369,232.
Notice of Allowance dated Jul. 23, 2012 from U.S. Appl. No. 12/369,565.
ArcFM UT, "A GIS for Utilities Based on Standards," White Paper, AED SICAD, Sep. 2008, 1-28.
Notice of Allowance dated Oct. 1, 2012 from U.S. Appl. No. 12/607,843.
Office Action dated Oct. 9, 2012 from U.S. Appl. No. 13/190,138.
Office Action dated Oct. 10, 2012 from U.S. Appl. No. 13/191,048.
Office Action dated Oct. 10, 2012 from U.S. Appl. No. 13/191,058.

* cited by examiner

ELECTRONIC MANIFEST OF UNDERGROUND FACILITY LOCATE MARKS

CROSS-REFERENCE TO RELATED APPLICATIONS

This patent application is a continuation of U.S. application Ser. No. 12/029,732, filed in the U.S. Patent and Trademark Office on Feb. 12, 2008 by Nielsen et al., the entire contents of which is incorporated herein by reference in its entirety.

BACKGROUND

1. Technical Field

The present disclosure generally relates to the field of electronic manifests, and more particularly, to a permanent and reproducible documentation of underground facility locate marks by computer-readable files.

2. Description of the Related Art

Excavators are required to notify underground facility owners/operators in advance of their excavation activities and to describe and communicate the geographic area of those activities to underground facility owners/operators. The geographic area so described is commonly referred to as "the dig area." In turn, facility owners/operators are required to determine if they own or operate any underground facilities at an identified dig area. The presence of underground facilities at a dig area is generally detected using a device commonly referred to as a "locate wand." Locate wands use a number of electronic methods to detect the presence of underground facilities. The presence of those underground facilities, if any, which exist within a dig area is marked using paint or some other physical marking system, such as flags. Paint is generally applied as a sequence of dashes or dots on the surface (grass, dirt, asphalt, concrete, etc.) above the underground facility and is color-coded to indicate to the excavator the type (e.g., gas, water, sewer, power, telephone, cable television, etc.) of the underground facility present. Flags, which also may identify the underground facility using color-coding, can be placed in the ground above the underground facility being marked. Paint and/or flags can be dispensed using various devices. The application of paint, flags, or some other marking object to indicate the presence of an underground facility is called a "locate" or "locate operation." The marks, for example, paint or flags, resulting from a locate are commonly called underground facility "locate marks."

Underground facility owners/operators may perform locates using in-house employees or choose to hire independent contract locating firms to perform locates on their behalf. Generally, the person performing the locate operation is called a locate technician. The set of instructions necessary for a locate technician to perform a locate operation may be called a "ticket." A ticket might specify, for example, the address or description of the dig area to be marked, the day and/or time that the dig area is to be marked, and/or whether the user is to mark the dig area for telecommunications (e.g., telephone and/or cable television), power, gas, water, sewer and/or some other underground facility.

It is generally recommended, or in some jurisdictions required, to document the type and number of underground facilities located, i.e., telephone, power, gas, water, sewer, etc. and the approximate geographic location of the locate marks. Often times, it is also recommended or required to document the distance, or "offset" of the locate marks from environmental landmarks that exist at the dig area. An environmental landmark may include any physical object that is likely to remain in a fixed location for an extended period. Examples of an environmental landmark may include a tree, a curb, a driveway, a utility pole, a fire hydrant, a storm drain, a pedestal, a water meter box, a manhole lid, a building structure (e.g., a residential or office building) or a light post. For example, a telephone cable located two and a half meters behind the curb of a residential street would be documented as being offset two and a half meters behind the curb. These offsets serve as evidence supporting the location of the locate marks after those locate marks may have been disturbed by the excavation process.

Documentation of some or all of the information regarding a locate operation is often called a "manifest." A manifest may typically contain a variety of information related to a locate operation including a sketch or drawing of the dig area that identifies the approximate location of the locate marks, environmental landmarks present at the dig area, the time and date the locate operation was performed, identification of the entity and the locate technician performing the locate operation, the entity requesting the locate operation, the geographic address of the dig area, the type of markings used for the locate operation (e.g., colored paint, flags or other markers), notes from the locate technician and/or a technician signature.

If performing locate operations using in-house employees, each individual underground facility owner and/or operator generally documents on the manifest only the existence of its facilities and the approximate location of its locate marks. If an independent contract locating firm is hired to perform locates for more than one underground facility owner and/or operator, the contract locating firm may document on the manifest some or all of the underground facilities at the dig area that it located and the approximate location of all the locate marks.

Currently, locate marks are generally documented using a sketching process, which results in the creation of a paper manifest. Sketches are produced by hand, are not to scale, are prone to human error and are costly in drafting time spent by the locate technician. They are stored manually or in some jurisdictions are digitally scanned and/or photographed and the image stored electronically. Since the manifests are stored as paper or digital images, they are not easily interrogated for data, categorized or useful for data examination or auditing of the information contained therein.

SUMMARY

According to one aspect of the present disclosure, image data is provided. The image data may include an image including a geographic location and a presence or an absence of at least one underground facility being noted on the image. A portion of the geographic location indicates a dig area.

According to another aspect of the present disclosure, a manifest including an electronic file associated with a geographic location is presented. A portion of the geographic location indicates a dig area. The manifest also includes indicia noting a presence or an absence of at least one underground facility within the dig area.

According to another aspect, a device may include a memory to store images of a plurality of geographic locations and a processing unit. The processing unit may retrieve one of the images from the memory based on received information, and the received information concerning a geographic location of an underground facility locate mark located within a particular dig area. The device further includes, present, on the retrieved image, the received information of the underground facility locate mark and store the retrieved image and the received information of the geographic location of the underground facility locate mark.

According to a further aspect, a system may include means for identifying a geographic location; means for retrieving an image of the geographic location; means for displaying the retrieved image; means for receiving input from a user concerning a geographic location of underground facility locate marks that are located within the dig area; means for presenting, on the displayed image, a marking that identifies the geographic location of the underground facility locate marks within the dig area; and means for storing the displayed image with the marking that identifies the geographic location of the underground facility locate marks.

According to another aspect, a system may include a central server to store a plurality of images of a plurality of geographical locations and a user device. The user device may identify at least one of the geographic locations, and to retrieve the images from the central server when the user device does not store the image corresponding to at least one of the geographic locations, or to retrieve the image from a local memory when the user device stores the image corresponding to the geographic locations; display the image; receive information regarding an approximate location of underground facility locate marks located at the particular geographic location; and present, on the displayed aerial image, a marking that identifies the approximate location of the underground facility locate marks.

BRIEF DESCRIPTION OF THE DRAWINGS

The objects and features of the present disclosure, which are believed to be novel, are set forth with particularity in the appended claims. The present disclosure, both as to its organization and manner of operation, together with further objectives and advantages, may be best understood by reference to the following description, taken in connection with the accompanying drawings as set forth below:

DETAILED DESCRIPTION OF EXEMPLARY EMBODIMENTS

The following detailed description refers to the accompanying figures. The same reference numbers in different figures may identify the same or similar elements. In addition, the following detailed description does not limit the present disclosure.

Figure 1:
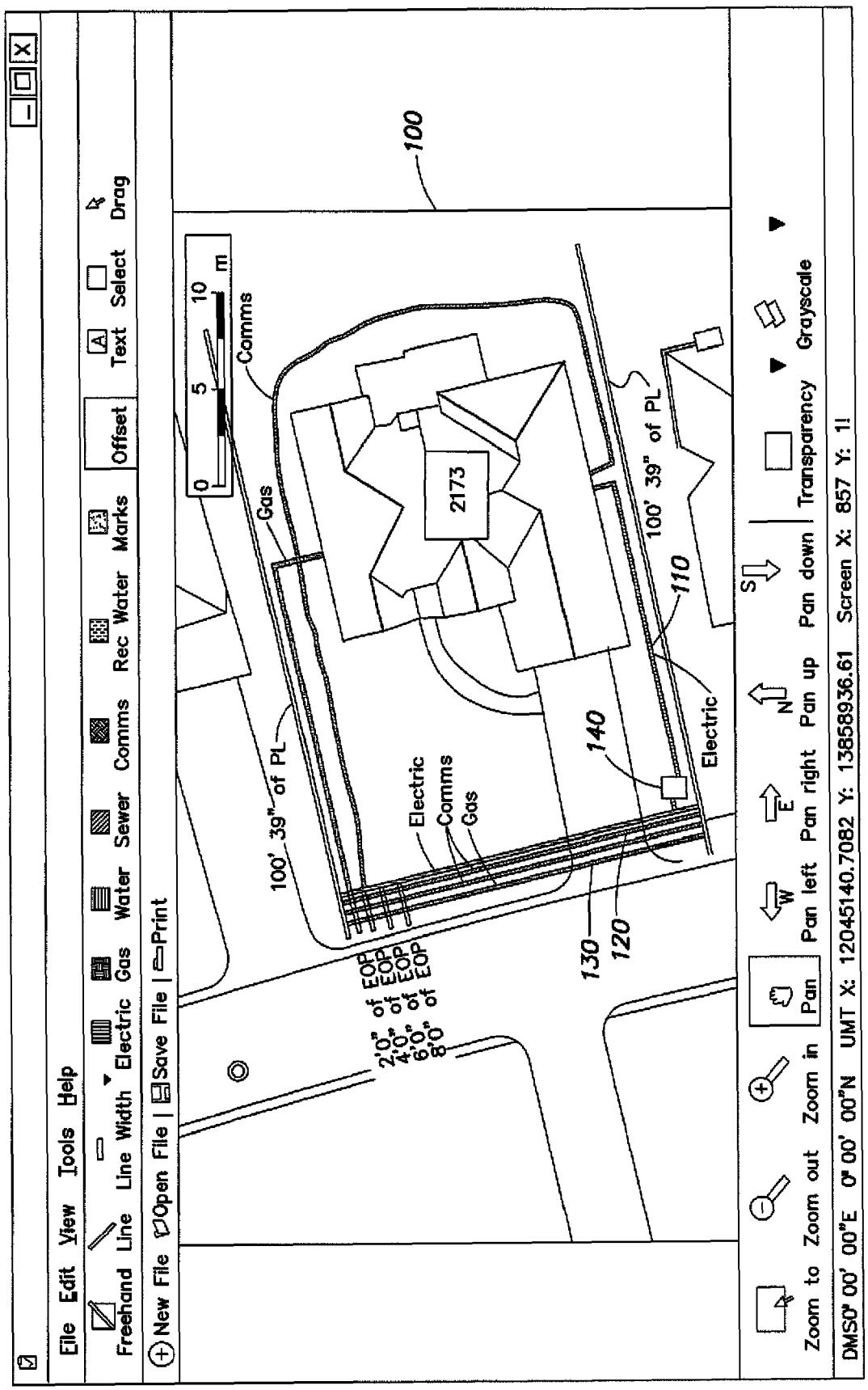
FIG. 1 is a diagram of a concept described within the present disclosure.

With reference to FIG. 1, a diagram of a concept as described within the present disclosure is depicted. When locating underground facilities at a geographic location, such as at a dig area 100 associated with a residence or a business, it may be beneficial to document locate marks in a permanent and reproducible manner. For example, a locate technician may locate and mark underground facilities using a locating device and/or a marking device. A locating device may generally be defined as a locating wand or another device used to detect the presence of underground facilities, while a marking device may generally be defined as any tool to apply paint or other material to a surface, such as a paint wand. The locate technician may use paint, flags, or some other object with a particular color or other characteristic to mark the presence of an underground facility. Referring to the example shown in FIG. 1, the locate technician may use red paint to mark underground power lines 110, orange paint to mark telecommunications (e.g., telephone and/or cable television) lines 120 and yellow paint to mark gas lines 130.

The locate technician may also identify one or more environmental landmarks that are present at or near the dig area and/or determine the distance between the environmental landmark(s) and the located underground facility. For example, a transformer 140 may be indicated as an environmental landmark, as shown in FIG. 1. The geographic location of transformer 140 may be used to measure offsets to other locate marks in the dig area.

As described herein, documentation of some or all of this information regarding a locate operation is created as an electronic manifest. An electronic manifest, as used herein, may generally refer to one or more computer-readable files that include some or all of the information in a manifest. The electronic manifest may be created using aerial images of a dig area, such as dig area 100, that may be combined with information that is added by the user about the locate marks and/or the environmental landmarks. In other implementations, an electronic manifest may be created using aerial images of a dig area combined with information about locate marks that is provided by other sources. Other implementations may use aerial images of a dig area combined with information that is added by the user and information that is provided by other sources. As used herein, an "aerial image" is intended to be broadly interpreted as any image taken from above the earth's surface, such as, for example, images generated using a satellite, airplane, helicopter or other moving or fixed device. In addition, as used herein, a "user" may refer to any person operating a device to create an electronic manifest, such as a locate technician, a site supervisor or any other person or group of people.

Figure 2:
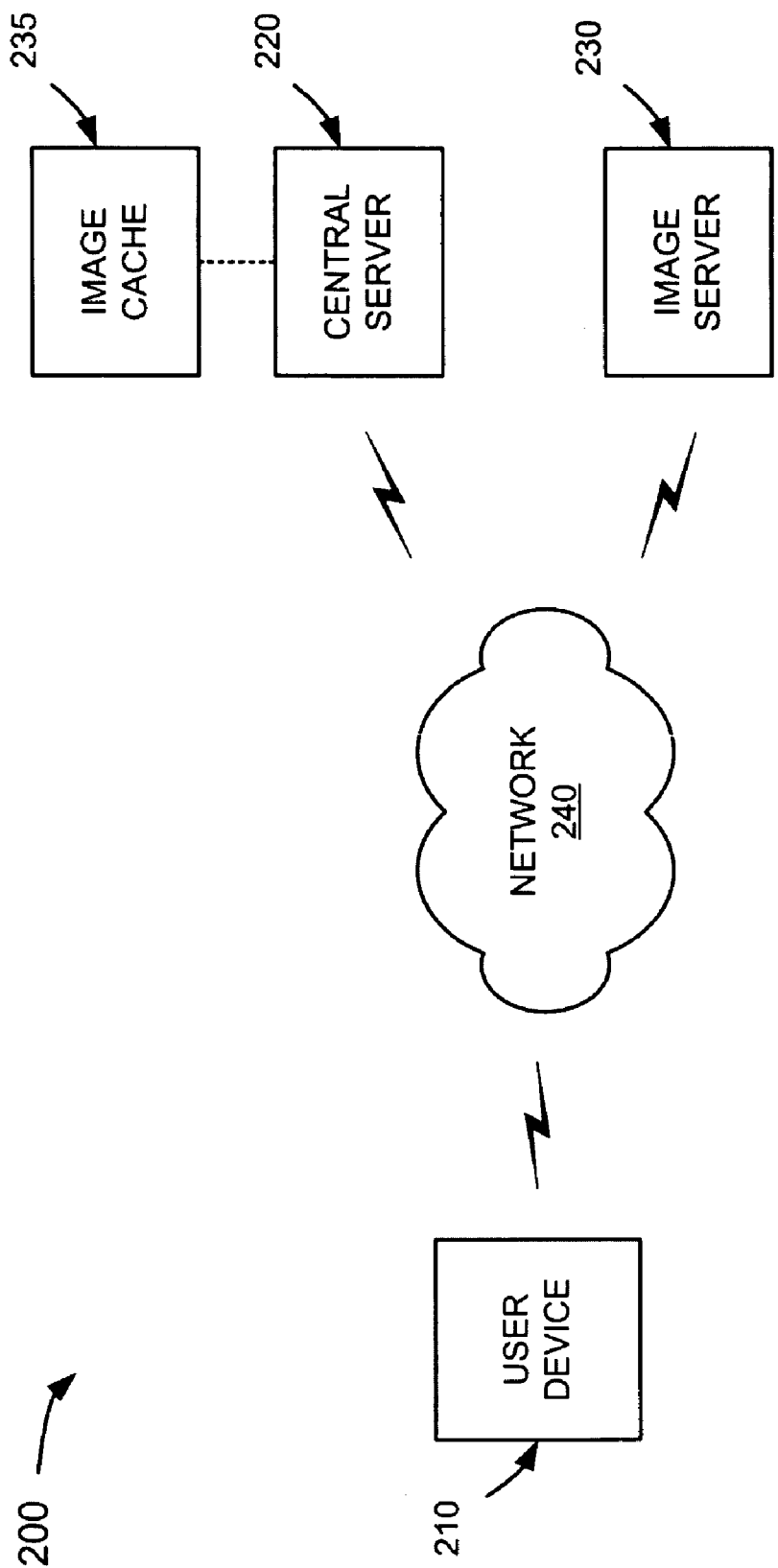
FIG. 2 is a diagram of an exemplary network in which systems and methods described within the present disclosure may be implemented.

Turning now to FIG. 2, a diagram of an exemplary network 200 in which systems and methods described herein may be implemented is shown. As shown in FIG. 2, the network 200 may include a user device 210 connected to a central server 220 and an image server 230 via a network 240. A single user device 210, central server 220 and image server 230 have been illustrated as connected to network 240 for simplicity. In practice, there may be more or fewer user devices and/or servers. For example, in one alternative implementation, the user device 210 may operate as a comprehensive device and, thus, the network 200 may include no central server, with user device 210 communicating directly through network 240 to image server 230. In addition, in some instances, the user device 210 may perform one or more of the functions of the central server 220 and/or central server 220 may perform one or more of the functions of the user device 210. In still another implementation, multiple user devices 210 may be connected to the central server 220 through the network 240.

The user device 210 may encompass a computer device, such as a laptop computer, a small personal computer, a tablet device, a personal digital assistant (PDA), a mobile computing device, a touch-screen device, or generally any device including or connecting to a processor and a display. The user device 210 may be portable so as to be separately carried by the user performing a locate operation. Alternatively, the user device 210 may be integrated with or affixed to another moveable object, such as a vehicle.

The central server 220 may include a computer device that may store information received from or provided to the user device 210 and/or the image server 230. The central server 220 may include storage capacity and/or optionally include networked access to one or more separate hardware components, such as images cache 235, to store cached images and the like.

The image server 230 may include a computer device that may store and provide aerial images of geographic locations. The image server 230 may be associated with the same, or a different, party that maintains the central server 220. For example, the image server 230 may be associated with a party that provides aerial images for a fee.

The network 240 may include a local area network (LAN), a wide area network (WAN), a telephone network, such as the Public Switched Telephone Network (PSTN) or a cellular network, an intranet, the Internet, a communications link or a combination of networks. The user device 210, central server 220 and image server 230 may connect to the network 240 via wired and/or wireless connections. The user device 210 and central server 220 may communicate using any communication protocol.

It is contemplated that data transfer and related communications within the present disclosure can be made through wireless interfaces including, for example, Internet, Bluetooth® technology, Wi-Fi, Wi-Max, IEEE 802.11 technology, Radio Frequency (RF), Local Area Networks (LAN), Wide Area Networks (WAN), Shared Wireless Access Protocol (SWAP), Infrared Data Association (IrDA) compatible protocols, and other types of wireless networking protocols, and combinations thereof.

Figure 3:
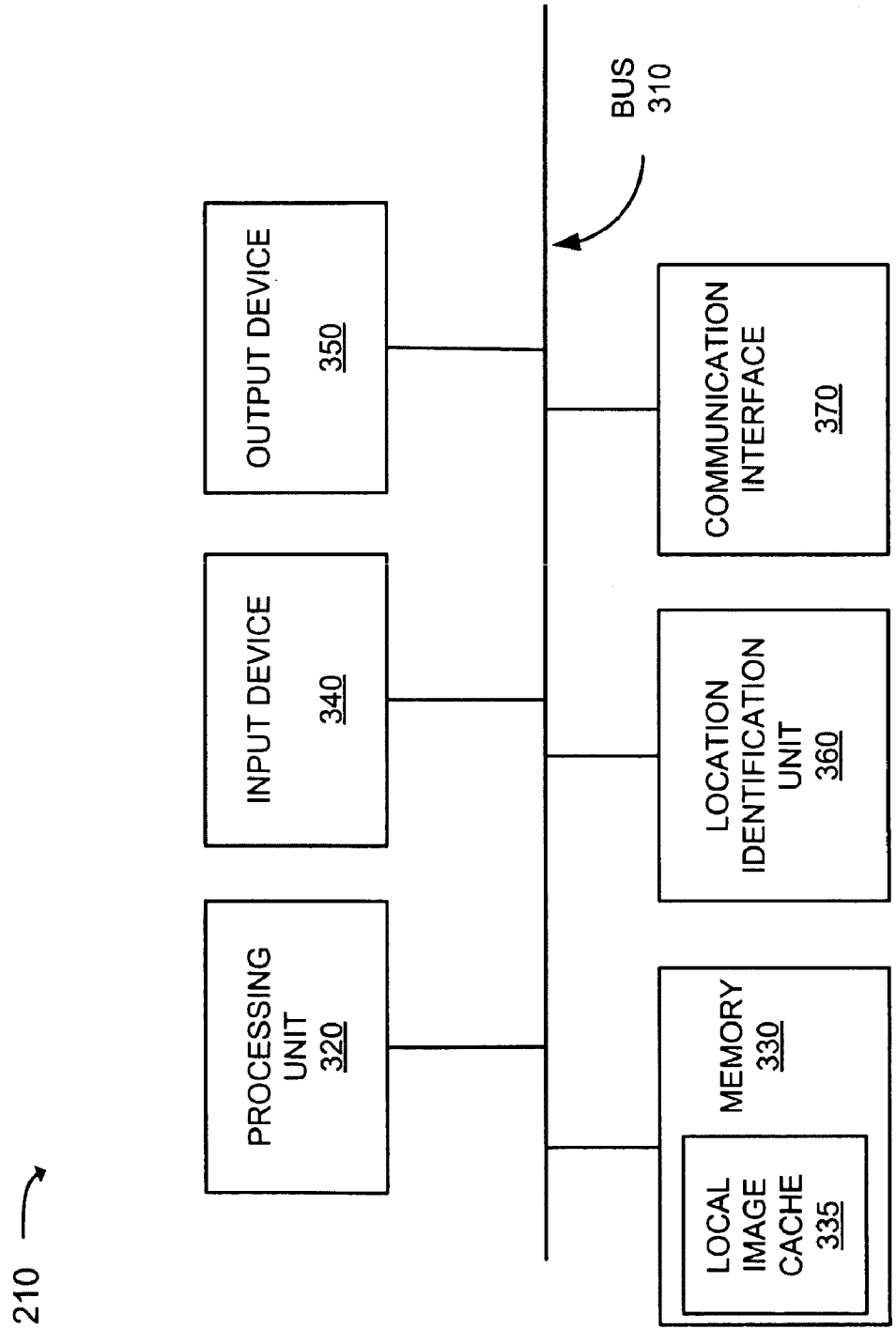
FIG. 3 is a diagram of exemplary components of a user device of FIG. 2.

Referring to FIG. 3, there is shown a diagram of exemplary components of user device 210. The user device 210 may include a bus 310, a processing unit 320, a memory 330, an input device 340, an output device 350, a location identification unit 360 and a communication interface 370. In another implementation, the user device 210 may include more, fewer or different components. For example, the location identification unit 360 may not be included, or the location identification unit 360 may be included as a device located external to the user device 210, such as a device worn or carried by a user of the user device 210.

The bus 310 may include a path that permits communication among the components of the user device 210. The processing unit 320 may include a processor, a microprocessor, or processing logic that may interpret and execute instructions. The memory 330 may include a random access memory (RAM), a read only memory (ROM), a memory card, a magnetic and/or optical recording medium and its corresponding drive or another type of memory device. Generally, the memory 330 may be sufficient to store and manipulate aerial images, such as those stored in a local image cache 335. In one implementation, the local image cache 335 may include one or more aerial images of a dig area to be marked by a user or locate technician. In another implementation, the local image cache 335 may include a series of aerial images that correspond to the geographical region to which a particular user is assigned. For example, local image cache 335 may include a collection of high-resolution images of a particular zip code or town. In still another implementation, the local image cache 335 may include an entire set of aerial images intended to be made available to multiple users.

The input device 340 may include one or more mechanisms that permit a user to input information to the user device 210, such as a keyboard, a keypad, a touchpad, a mouse, a stylus, a touch screen, a camera, or the like. Alternatively, or additionally, the input device 340 may include a microphone that can capture a user's intent by capturing the user's audible commands. Alternatively, or additionally, the input device 340 may interact with a device that monitors a condition of the user, such as eye movement, brain activity, or heart rate. The output device 350 may include a mechanism that outputs information to the user, such as a display, a speaker or the like.

The location identification unit 360 may include a device that can determine its geographic location to a certain degree of accuracy, such as a global positioning system (GPS) or a global navigation satellite system (GNSS) receiver. In another implementation, the location identification unit 360 may include a device that determines location using other known locating techniques, such as tower (e.g., cellular tower) triangularization. The location identification unit 360 may receive location tracking signals (e.g., GPS signals) and determine its location based on these signals. In one implementation, location identification unit 360 may be capable of determining its location within approximately thirty centimeters or less.

The communication interface 370 may include any transceiver-like mechanism that enables user device 210 to communicate with other devices and/or systems. For example, the communication interface 370 may include mechanisms for communicating with another device or system via a network. For example, the communication interface 370 may enable communications between the user device 210 and the central server 220 and/or image server 230 over network 240.

As will be described in detail below, user device 210 may perform certain operations relating to the documentation of locate operations and/or the creation of an electronic manifest. User device 210 may perform these operations in response to the processing unit 320 executing software instructions contained in a computer-readable medium, such as the memory 330. A computer-readable medium may be defined as a physical or logical memory device.

The software instructions may be read into the memory 330 from another computer-readable medium, or from another device via the communication interface 370. The software instructions contained in the memory 330 may cause processing unit 320 to perform processes that will be described later herein. Alternatively, hardwired circuitry may be used in place of, or in combination with, software instructions to implement processes described herein. Thus, implementations described herein are not limited to any specific combination of hardware circuitry and software.

Figure 4:
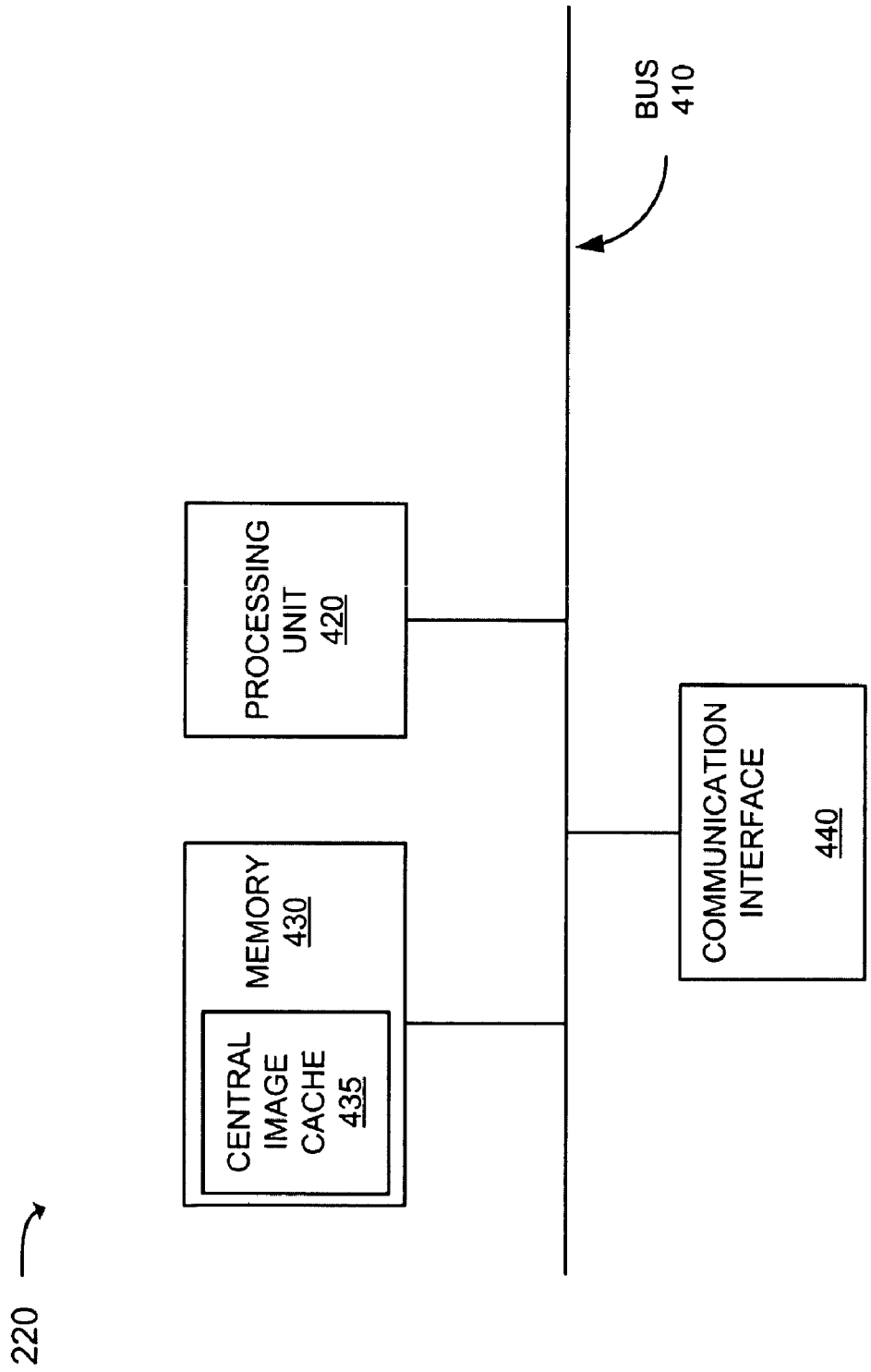
FIG. 4 is a diagram of exemplary components of a central server of FIG. 2.

With reference to FIG. 4, a diagram of exemplary components of central server 220 is depicted. The central server 220 may include a bus 410, a processing unit 420, a memory 430 and a communication interface 440. In another implementation, the central server 220 may include more, fewer or different components. For example, an input device and/or an output device (not shown) may be included, as necessary.

The bus 410 may include a path that permits communication among the components of the central server 220. The processing unit 420 may include a processor, a microprocessor, or processing logic that may interpret and execute instructions. The memory 430 may include a magnetic and/or optical recording medium and its corresponding drive, a RAM, a ROM, a memory card, or another type of memory device suitable for high capacity data storage. Generally, the memory 430 may be sufficient to store aerial images of particular geographic locations, such as those stored in a central image cache 435. In one implementation, the central image cache 435 may include a set of aerial images that correspond to the geographical regions to which a group of users are assigned. In still another implementation, the central image cache 435 may include the entire set of aerial images intended to be made available to any of a group of users. For example, central image cache 435 may include a collection of high-resolution aerial images of a particular county, state or other geographic region. In another implementation, as shown in FIG. 2, central image cache 435 may be replaced or supplemented with one or more networked storage components, such as image cache 235.

The communication interface 440 may include any transceiver-like mechanism that enables the central server 220 to communicate with other devices and/or systems. For example, the communication interface 440 may include mechanisms for communicating with another device or system via a network. For example, the communication interface 440 may enable communications between the central server 220 and the user device 210 and/or image server 230 over network 240.

As will be described in detail below, the central server 220 may perform certain operations to facilitate the documentation of locate operations and/or the creation of an electronic manifest. The central server 220 may perform these operations in response to the processing unit 420 executing software instructions contained in a computer-readable medium, such as the memory 430.

The software instructions may be read into the memory 430 from another computer-readable medium or from another device via the communication interface 440. The software instructions contained in the memory 430 may cause processing unit 420 to perform processes that will be described later. Alternatively, hardwired circuitry may be used in place of or in combination with software instructions to implement processes described herein. Thus, implementations described herein are not limited to any specific combination of hardware circuitry and software.

Figure 5:
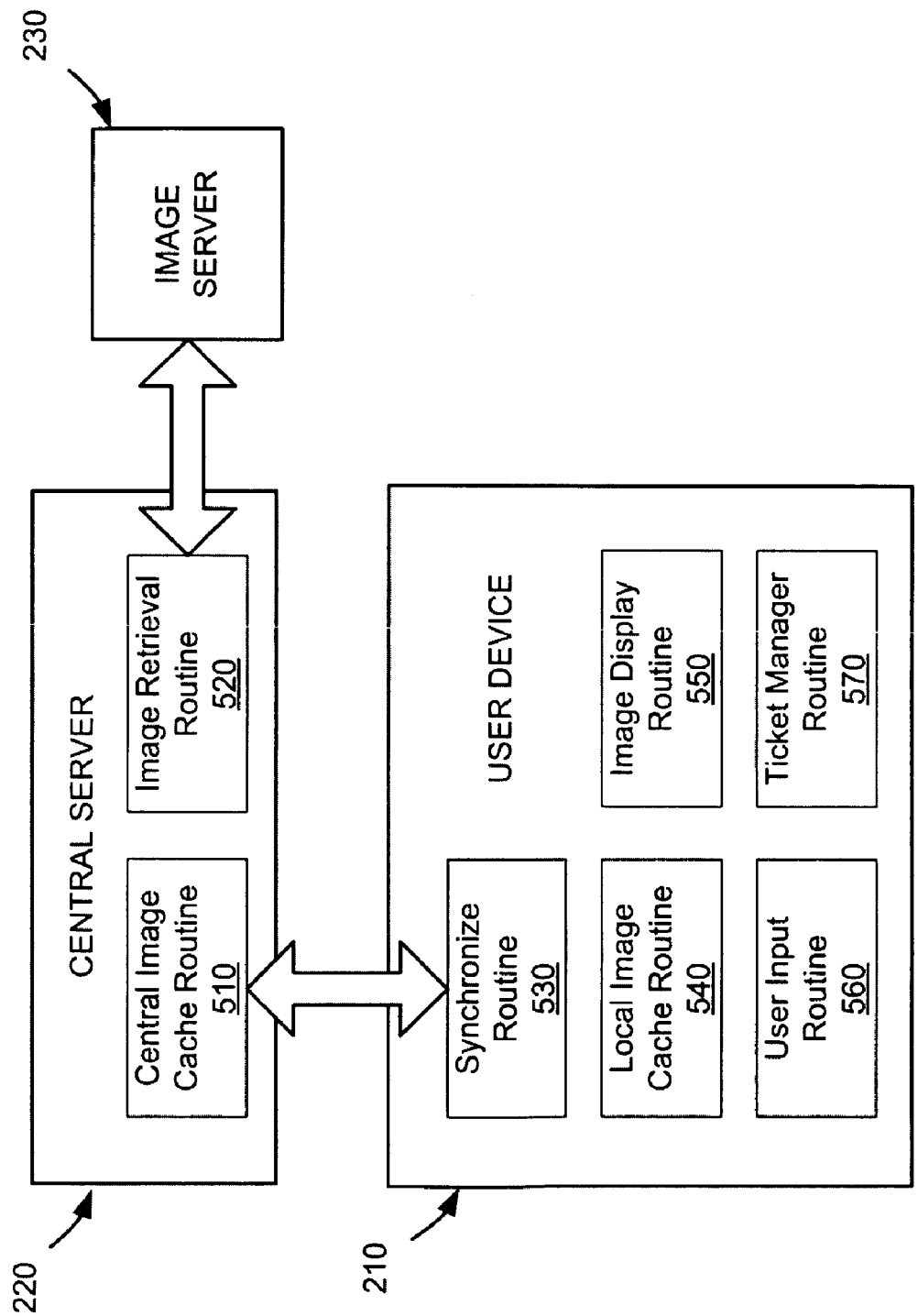
FIG. 5 is a diagram of exemplary software routines for components of FIG. 2.

Turning now to FIG. 5, a diagram of exemplary software routines for the components shown in FIG. 2 are depicted. The central server 220 may include an image retrieval routine 510 and a central image cache routine 520. The user device 210 may include a synchronize routine 530, a local image cache routine 540, an image display routine 550, a user input routine 560, and a ticket manager routine 570. As discussed in more detail herein, the examples of routines associated with the central server 220 and the user device 210 may be interchangeable between each hardware component. Furthermore, some or all of routines 510, 520, 530, 540, 550, 560, and 570 need not be performed exclusively by any one hardware component.

Still referring to FIG. 5, the image server 230 may store a library of aerial images. Generally, the aerial images may be of sufficient resolution at an optimal elevation to be useful as a record of the locate operation. The aerial images from the image server 230 may include geocoding or other geographical identification and metadata and may be provided in any computer-readable format, such as JPEG file interchange format (JPEG), tagged image file format (TIFF), portable document format (PDF), graphics interchange format (GIF), bitmap (BMP), portable network graphics (PNG), Windows® metafile (WMF), and/or the like. In addition, aerial images from the image server 230 may include a combination of images or overlays, such as overlays of street names, regions, landmark descriptions and/or other information about areas displayed in an image. The aerial images from the image server 230 may be supplied by a third-party provider if the coverage area of the third-party image provider overlaps with the desired area of the user.

The central image cache routine 510 and the image retrieval routine 520 of the central server 220 may include a variety of functionalities. In certain implementations, the central image cache routine 510 may receive information about specific tickets and parse tickets in order to discern location information. For example, a ticket may identify the dig area by an address of the property or by geographic coordinates. The ticket might specify, for example, the address or description of the dig area to be marked, the day and/or time that the dig area is to be marked, and/or whether the user is to mark the dig area for telecommunications (e.g., telephone and/or cable television), power, gas, water, sewer or some other underground facility.

The central image cache routine 510 may also convert dig area location information to latitude/longitude coordinates or other coordinates. When location information from a ticket is sufficiently precise to allow for identification of corresponding imagery, the central image cache routine 510 may calculate the image extent (which may be generally defined as the bounding region of the dig area of interest), and update the ticket with the calculated extent. In one implementation, the central image cache routine 510 may determine image date, coordinates, and resolution of each image that may be stored in the central image cache 435 or in another location. In another implementation, when location information from a ticket is imprecise (or "fuzzy"), the central image cache routine 510 may mark the ticket to indicate that no corresponding image was able to be retrieved based on the ticket information.

In another implementation, central image cache 510 may identify an image to retrieve based on GPS coordinates of a GPS-enabled device associated with a user. For example, a user may arrive at an excavation site in a GPS-enabled vehicle and the GPS information from the vehicle may be used to identify coordinates corresponding to an image to be retrieved. GPS coordinates may also be obtained from other GPS-enabled devices being used by or in the vicinity of the user. As used herein, a GPS-enabled device may include any device or combination of devices capable of interfacing with a global navigation satellite system, geo-spatial positioning system or other location-identification system to determine a location. Examples of GPS-enabled devices may include a marking device (e.g., a paint wand) with an integrated GPS receiver, a locating device (e.g., a locating wand) with a GPS receiver, a wearable GPS-enabled device, a vehicle-mounted GPS system, certain PDAs, computers, and cellular telephones and stand-alone GPS-enabled systems.

In still another implementation, central image cache 510 may identify one or more images to request based on a designated geographical area assigned to a user. For example, a user may be assigned to work in several dig areas associated with a particular section of a neighborhood. The user may input coordinates associated with the entire selected section of the neighborhood, and central image cache 510 may then retrieve images for those coordinates.

The image retrieval routine 520 catalogues and stores images from the image server 230 to the central server 220. For example, images may be stored in the central image cache 435 in the memory 430 of the central server 220. In one implementation, the image retrieval routine 520 may query the central image cache 435 or other cache for an image associated with a particular dig area relating to a ticket of interest, and determine, based on (for example) the age and resolution of the cached image, whether the image in the central image cache 435 needs to be updated from the image server 230.

In another implementation, the image retrieval routine 520 may interface with multiple image providers and image servers 230. The image retrieval routine 520 may determine which image provider is the best source for the image corresponding to a particular dig area relating to a ticket of interest based on algorithms that factor, for example, each image provider's geographical coverage, image resolution, cost, and availability. Regarding geographical coverage, it will be beneficial to confirm that the image provider's area of coverage includes the desired extent (in other words, the entire geographical region of interest to the user).

Regarding image resolution, available resolution may be measured in meters (or centimeters, feet, or inches) per pixel. For example, one provider may offer thirty centimeters per pixel, while another offers fifteen centimeters or less per pixel, for the same coverage area. If an image is requested at a standard altitude, then the image retrieval routine 520 may choose a pre-defined optimal scale (for example, thirty centimeters per pixel for a rural area, but fifteen centimeters per pixel for an urban area) and determine which provider provides images at the pre-defined optimal scale. Alternatively, if the image of interest is at a less granular scale (for example, a community or neighborhood image that allows the locator to pan around the image), then resolution may not be a significant factor.

Regarding cost, the image retrieval routine 520 may have access to pricing information for a variety of image providers. The image retrieval routine 520 may identify which provider has the lowest cost for the desired image. Cost analysis may be based on images desired for an individual ticket or the algorithm may account for a group of image requests, including volume incentives and/or penalties from each image provider.

Regarding availability of image providers, the image retrieval routine 520 may identify which providers are available and/or operational. Also, if an image provider has a regular latency profile (for example, if a provider has a particular server that is busiest 3-5 PM Pacific time), then the image retrieval routine 520 may manage requests to be provided to another image provider or to a particular server of that image provider to efficiently load share the image retrieval.

When an image provider is selected, the image retrieval routine 520 may download the image from the selected image provider's server, which may be an image server 230. The downloaded image may be stored locally, for example, in the central image cache 435.

It should be understood that some of the routines and/or functionalities described above with respect to the central image cache routine 510 and the image retrieval routine 520 may be performed by one or both of the routines 510 and 520 above, and the arrangement of functionalities are not limited to the implementations disclosed herein.

The synchronize routine 530 for user device 210 may ensure that images already stored and manipulated on the user device 210 correspond to images stored in the central server 220. When a user performing a locate operation identifies a ticket or dig area, the synchronize routine 530 may check if an image exists in the central server 220 that matches the extent requested, and if the matching image is up-to-date in, for example, the local image cache 335. The synchronize routine 530 may also synchronize images from the central server 220 cache and store copies locally in the user device 210.

If the ticket has a valid extent (i.e., a recognizable boundary), the local image cache routine 540 may associate the ticket information with an image matching the extent. The local image cache routine 540 may load the image from the local image cache 335. If the ticket does not have a valid extent, the local image cache routine 540 may accept address information that is entered by the user. Alternatively, the local image cache routine 540 may read the local address information from the ticket or from a GPS-enabled device in communication with the user device 210 so that address information may be pre-entered for the user to the extent possible. Address information may include, for example, a street address, street name, city, state, and/or zip code. If either none or multiple stored addresses appear to be associated with particular address information, the local image cache routine 540 may display a list of best match addresses from which a user can select.

Once an image is loaded from the local cache 335, image display routine 550 may provide a variety of view options for the user. For example, the image display routine 550 may support zooming in and out of the image by changing the image scale. In addition, the image display routine 550 may support panning horizontally and vertically in the image. Furthermore, the image display routine 550 may support "roaming" outside the boundaries of the initial extent. Roaming generally occurs when the user zooms or pans, such that images beyond the boundaries of the stored images may be required to be retrieved (using, for example, synchronize routine 530) from either the local image cache 335 or the central server 220. The additional images retrieved from either the local image cache 335 or the central server 220 may be displayed and stitched together to display a complete image.

The user input routine 560 allows the user to add information to the image to create an electronic manifest. The user input routine 560 may accept user input from, for example, input device 340, and may support the addition of lines, freehand forms (or scribbling), shapes such as circles and rectangles, shading, or other markings, which denote the approximate location of underground facilities that are present within the dig area. A drawing shape may generally be any kind of drawing shape or mark. The user input routine 560 may further enable drawing of underground facility locate marks for telecommunications (e.g., telephone and cable television), gas, power, water, sewer, and the like, so that each type of drawn locate mark is distinguishable from the other (s). The user input routine 560 may limit the display of such facilities by the type of work, which is to be performed according to the instructions included within the user's assigned ticket. In addition to the marking of the underground facility locate marks on the aerial image, user input routine 560 may also include offsets from environmental landmarks that may be displayed on the image in, for example, English or metric units. Environmental landmarks may also be marked and/or highlighted on the aerial image. The user input routine 560 may also accept positioning information from external sources, such as a GPS-enabled device. The user input routine 560 may further include features to annotate the image with text and to revise user inputs by, for example deleting, dragging or pasting shapes. In one implementation, when the user zooms the image view in or out, user input (e.g., lines and/or shapes) that have been added to the original image may adhere to the changing image scale and remain in the original user-input locations.

The electronic manifest, which is a compilation of the aerial image and user inputs, may be saved as an image file. In another implementation, the user inputs may be saved in a mark-up format, including the geo-coordinates and underground facility type of each input.

In one implementation, the user device 210 may interface with a ticket management program for coordinating multiple tickets. The ticket manager routine 570 may facilitate such an interface. The ticket management program for coordinating multiple tickets may reside on the central server 220, for example, or on a separate server that is accessible to the user device 210. Generally, tickets may be stored on a central server and assigned to a user. When a user edits a ticket, the user may also have created an electronic manifest associated with the ticket. The ticket manager routine 570 may allow the user to synchronize the user's ticket cache with the company's central database and also synchronize the images and user input. The ticket manager routine 570 may copy images from the central server 220 to the user device 210 for new tickets and will copy the user input from the user device 210 to the central server 220 for completed tickets. The ticket manager routine 570 may interface with the routines described above to correlate a user's assigned tickets with images for those tickets and download the images to the user device from the central server 220. The ticket manager routine 570 may retrieve the corresponding ticket number from the ticket management program when the user retrieves an image or the ticket manager routine 570 may retrieve the image corresponding to an entered ticket number.

Figure 6:
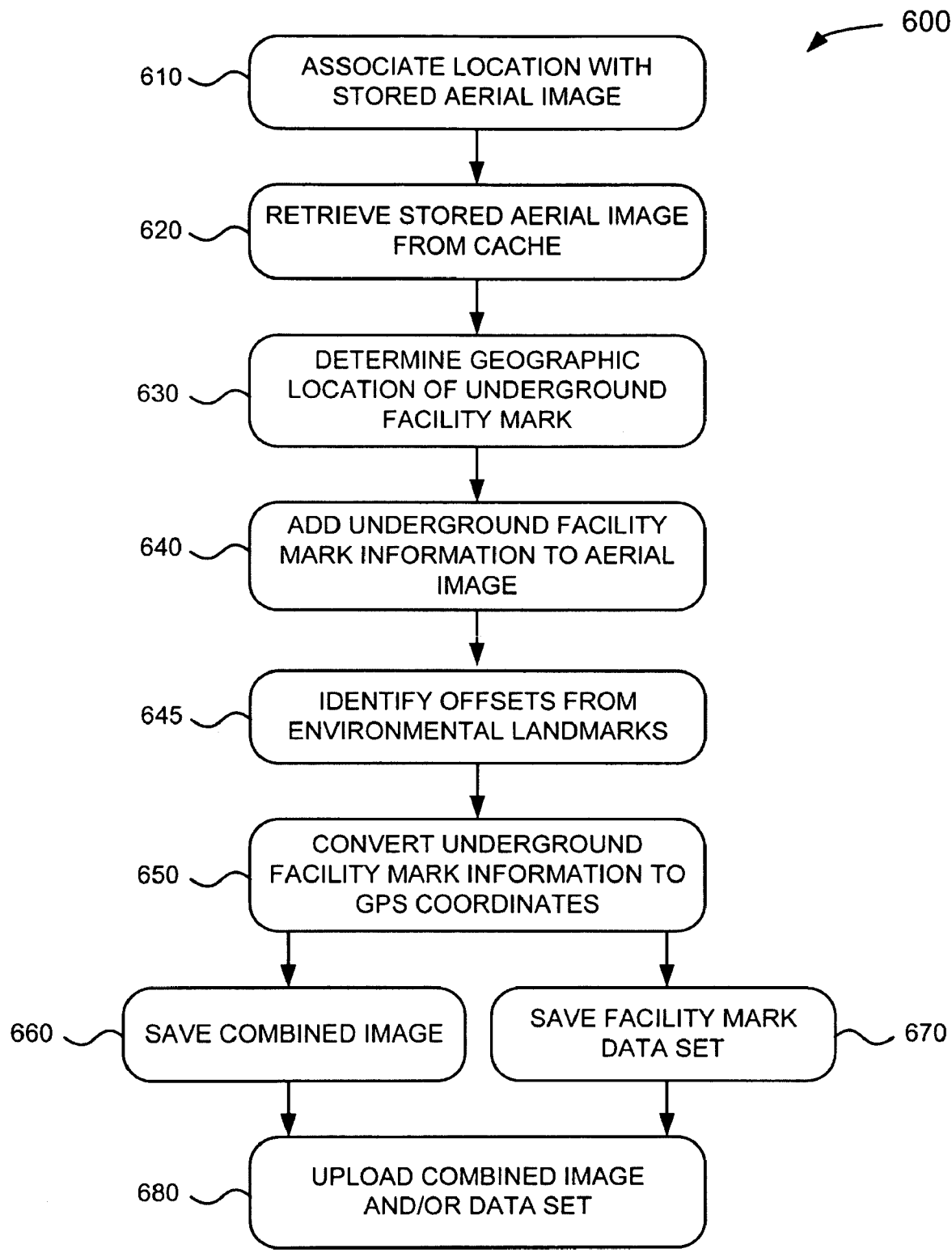
FIG. 6 is a flowchart of an exemplary process for creating an electronic manifest of underground facility locate marks.

Referring now to FIGS. 2 and 6, a flowchart 600 of an exemplary process for creating an electronic manifest relating to underground facility locate marks is provided. In one implementation, at least some of the blocks of FIG. 6 may be performed using user device 210. In another implementation, one or more of the blocks of FIG. 6 may be manually performed or performed by another device, such as central server 220.

The process 600 may begin with a user being dispatched to a dig area to be located. The user might be given a ticket that identifies what underground facilities the user needs to locate at the dig area. The ticket might specify, for example, the address or description of the dig area to be located, the day and/or time that the dig area is to be located, and/or whether the user is to locate the dig area for telecommunications, power, gas, water, sewer or other underground facility. Based on information in the ticket, or other information about the dig area to be located, user device 210 in block 610 may associate the property address with a stored aerial image of the dig area. Such association may include associating the address with geographic location information, such as global positioning coordinates for the dig area extent (or boundary).

In block 620, the stored aerial image associated with the dig area to be located is retrieved from a cache of images and loaded into the user device 210. As previously described with respect to FIG. 5, the cache of images may reside within the user device 210, the central server 220, a separate image server, or another storage device.

In block 630, the user may perform a locate operation to locate the underground facilities present within the dig area and mark the located underground facilities using a locating device, marking device, and/or a combined locating/marking device. For example, the user may use the locating device to identify an underground facility at the dig area and may use the marking device to mark the underground facility with the appropriate marker (e.g., color paint, flag or some other object). In certain implementations, information regarding the approximate geographic location of the applied underground facility locate marks may be gathered and stored electronically using a GPS-enabled device or other location identification device. The approximate geographic location of the underground facility locate marks may be determined, for example, by identifying the current geographic location of the GPS-enabled device as the user performs the locating or marking. In another implementation, a user may use a triangularization technique to determine the approximate geographic location of the underground facility locate marks. In yet another implementation, a user may determine latitude and longitude coordinates or some other measurement of a geographic location.

In block 640, information about the approximate geographic location of the underground facility locate marks may be added to the stored aerial image that was retrieved previously in block 620. The information about the approximate geographic location of the underground facility locate marks may be input by the user using an input device, such as input device 340 (FIG. 3) of user device 210. Additional aspects regarding information to be input by the user is discussed in more detail herein with respect to FIG. 8.

Still referring to block 640, information about the approximate geographic location of the underground facility locate marks may also be received directly from a GPS-enabled device, such as the GPS-enabled locating device or marking device used in block 630 and overlaid on the retrieved image. The user may use a combination of received GPS information and manual entries to create an electronic manifest of the underground facility locate marks.

In block 645, if necessary, information about offsets of the underground facility locate marks from environmental landmarks may be added to the stored aerial image that was retrieved previously in block 620. As with the input of the facility locations in block 640, the location of the environmental landmarks may be input by the user using an input device, such as input device 340 (FIG. 3) of user device 210 or automatically input from a GPS-enabled device. The offset information may be automatically calculated or input by the user. Offset information may also be obtained by identifying selected environmental landmarks on the retrieved image and automatically calculating the distance from the selected environmental landmarks to the underground facility locate marks overlaid on the image.

In block 650, if necessary, information about the location of the underground facility locate marks may be converted to GPS coordinates. In block 660, the retrieved aerial image and information about the location of the underground facility locate marks may be stored in memory as a single combined image or electronic manifest. The electronic manifest may be stored as, for example, a digital image or an interactive electronic map. Additionally or alternatively, in block 670, the geographical coordinates of the underground facility locate marks may be stored in memory, such as memory 330 (FIG. 3), as a separate data set. The data set may be compiled as, for example, a database of GPS coordinates. In block 680, the combined image and/or separate data set may optionally be transmitted to a central location, such as central server 220 (FIG. 2).

Figure 7:
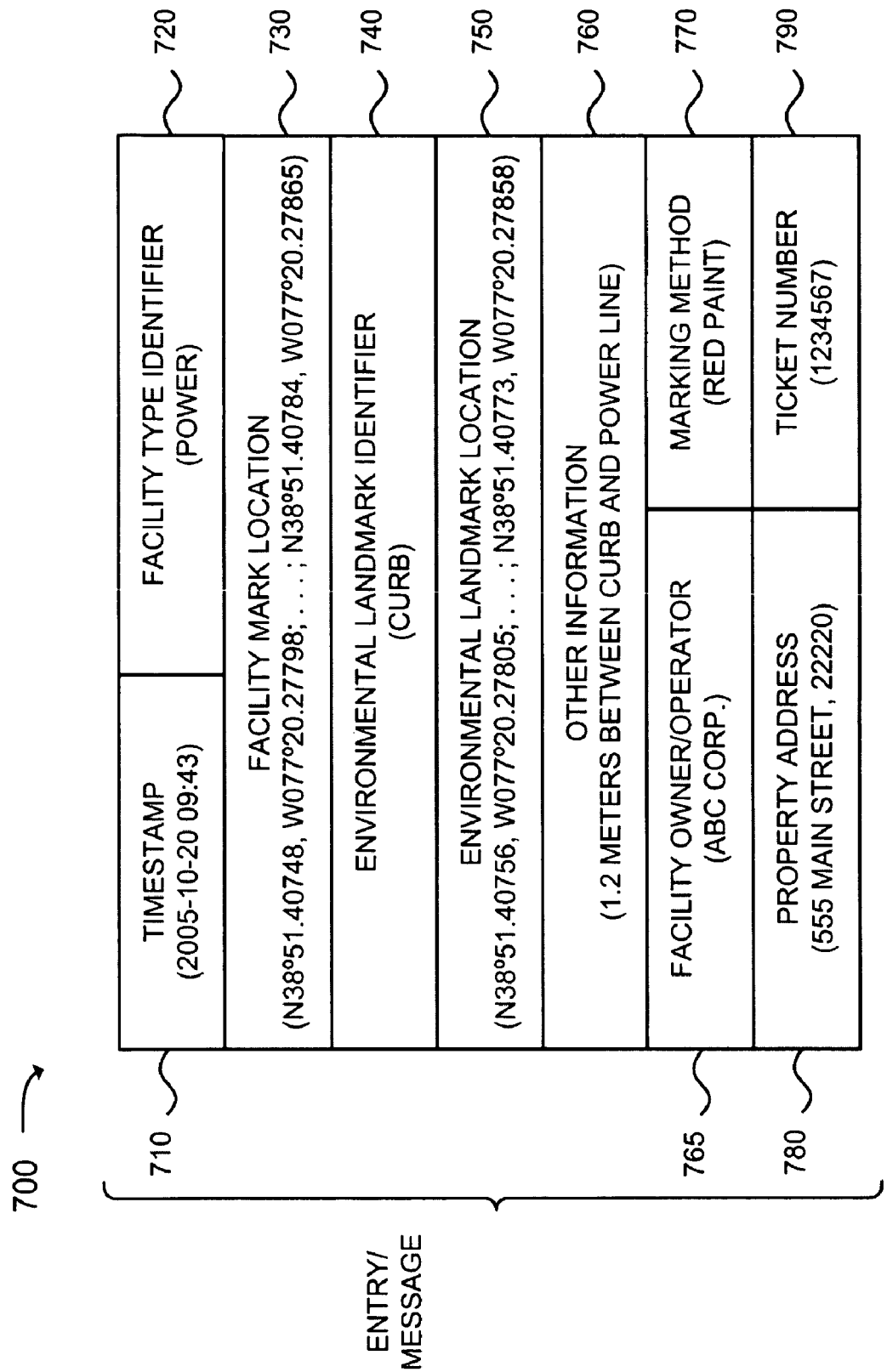
FIG. 7 is a diagram of an exemplary data set that may be stored in the memory of the components of FIG. 3 and/or FIG. 4.

With reference to FIG. 7, a diagram of an exemplary data set that may be stored in memory 330 and/or transmitted to server 220 is shown. As shown in FIG. 7, a data set 700 may include a timestamp field 710, an underground facility identifier field 720, an underground facility location field 730, an environmental landmark identifier field 740, an environmental landmark location field 750, an other information field 760, a marking method field 770, a property address field 780, and a ticket number field 790. In another implementation, the data set 700 may include additional, fewer or different fields. As used in the present disclosure, time data and timestamp data may include, for example, time and date information.

Timestamp field 710 may include time data that identifies the day and/or time that the environmental landmark location was identified. The time data in timestamp field 710 is shown in FIG. 7 as 9:43 a.m. on Oct. 20, 2005, although any type of date and/or time code may be used. The information in timestamp field 710 may be useful in establishing when a locate operation occurred.

The underground facility identifier field 720 may include an identifier that uniquely identifies the type of underground facility that was marked. The identifier in underground facility identifier field 720 is shown in FIG. 7 as "power," although any type of identifier may be used. Underground facility location field 730 may include geographic location information corresponding to an underground facility locate mark. In one implementation, the geographic location information may include a set of geographic points along the marking path of the located underground facility. The geographic location information in underground facility location field 730 is shown in FIG. 7 as N38°51.40748, W077°20.27798; . . . ; N38°51.40784, W077°20.27865, although any type of geographic location information may be used. The information in underground facility location field 730 may be useful in graphically presenting the underground facility locate marks on a map and/or to verify that the locate operation was actually and accurately performed. Additionally, or alternatively, underground facility location field 730 may include geographic location information for multiple underground facility locate marks.

Environmental landmark identifier field 740 may include an identifier that uniquely identifies the type of environmental landmark being marked. The identifier in environmental landmark identifier field 740 is shown in FIG. 7 as "curb," although any type of identifier may be used.

Environmental landmark location field 750 may include geographic location information corresponding to the environmental landmark identified in environmental landmark identifier field 740. The geographic location information in environmental landmark location field 750 is shown in FIG. 7 as N38°51.40756, W077°20.27805; . . . ; N38°51.40773, W077°20.27858, although any type of geographic location information may be used.

Other information field 760 may store other data that may be useful, including user notes, such as distance information that identifies a distance between one or more environmental landmarks and one or more underground facility locate marks. Other information field 760 is shown in FIG. 7 as including, "1.2 meters between curb and power line," although any other data may be used. Additionally and/or alternatively, other information field 760 may include audio/voice data, transcribed voice-recognition data or the like to incorporate user notes.

The underground facility owner field 765 may include the name of the owner/operator of the underground facility that has been marked during the locate operation. For example, in FIG. 7, the underground facility owner field 765 is shown as "ABC Corp." Since multiple underground facilities may be marked during a single locate operation, it may be beneficial to associate each marked underground facility with a particular owner/operator.

Marking method field 770 may indicate the type of marking used at the dig area to indicate the location of an underground facility. For example, in FIG. 7, marking method field 770 is shown indicating red paint. Property address field 780 may be the property address associated with the marking recorded in the data set 700. The property address field 780 may include, for example, the street address and zip code of the property. Other information in field 780 may include city, state and/or county identifiers. The ticket number field 790 may include the ticket number associated with the locate operation, such as ticket "1234567" shown in FIG. 7.

In one implementation, the user device 210 may store multiple data sets corresponding to multiple underground facilities identified at a particular dig area. User device 210 may provide the data sets to server 220 in a batch, such as a batch corresponding to the group of underground facilities documented within the electronic manifest, or individually. The batch may be grouped together with other information generally relating to the locate operation, such as the name of the company responsible for performing the locate operation, the name of the locate technician and the like. Additionally, or alternatively, the other information generally relating to the locate operation may be included in each data set.

Figure 8:
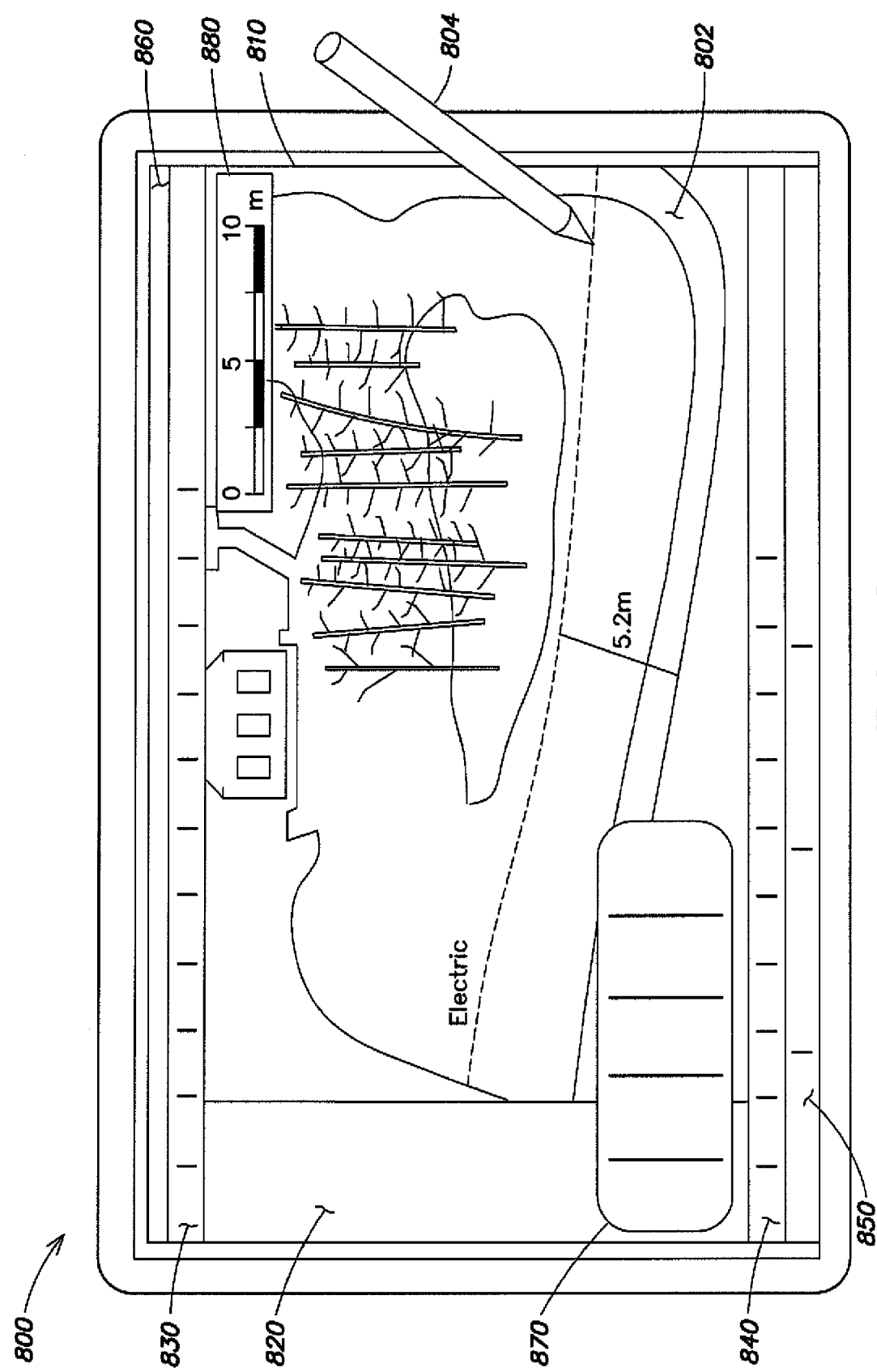
FIG. 8 is a diagram of an exemplary user interface that may be presented via the user device of FIG. 2.

With reference to FIG. 8, an exemplary diagram of a user interface 340 that may be presented via the user device 210 is shown. The user interface may be presented on a screen 800 that may be the screen of the user device 210, as described herein with respect to FIG. 2. The screen 800 may display a variety of graphical elements, including but not limited to: a map control 810, an address search panel 820, a locator palette 830, a navigation palette 840, a status bar 850, a menu bar 860, a service grid 870, and a scale bar 880.

Map control 810 generally may be the surface or canvas, where images, such as an exemplary image 802, are displayed. The user may draw or input shapes "on top of" this surface using for example, the input device 340 of FIG. 3 to identify underground facility locate mark locations. FIG. 8 shows a stylus 804 as an exemplary form of input device 340.

The address search panel 820 may be used to identify images corresponding to a desired address. Panel 820 may, for example, accept a partial or complete address and allow the user to search for matches. If an excessive number of addresses match the search, then the size of the result set may be constrained. Address search results may be displayed which match the address search. The listed matches may serve as a springboard for displaying the image desired by the user. For example, when the user taps with a stylus 804 on an address match, the user device 210 may load the image corresponding to the selected address. As described above, this image may be stored locally on user device 210 or retrieved from central server 220.

Palettes may be generally defined as a toolbar or toolbars containing soft buttons or other controls that are grouped in some logical order. The buttons on a palette may duplicate the commands available on the menu bar 860. The locator palette 830 may allow the user to select the type of underground facility locate marks (e.g., electric, gas, water, sewer, telecommunications, etc.) the user will draw on the image 802. The locator palette 830 may also include a choice of various shapes or shades, such as freestyle, line, circle, rectangle or other polygon that the user may select to draw on the image 802. In one implementation, the locator palette 830 may present a list of potential environmental landmark identifiers. In this case, the user may select an environmental landmark identifier from the list to overlay at the appropriate place on the aerial image 802.

The locator palette 830 may also include an offset tool that allows the user to mark the distance between, for example, an environmental landmark identifier and a drawn underground facility locate mark. Once the user has chosen the type of shape they wish to draw (freestyle, line, polygon, shading, etc.) the application may track the user's movements to define the layout and location of the shape. The shape may be completed when the user terminates the drawing (for example, by lifting the stylus 804 or releasing the mouse button). A text label or other indicator may be added to the shape automatically based on the type of underground facility locate mark or environmental landmark selected (e.g., "electric" or "curb") or may be manually added.

The navigation palette 840 may allow the user to zoom or pan the image 802. For example, the navigation palette 840 may include selections to zoom in, zoom out or zoom to a selected section of the image. The navigation palette 840 may also include pan command buttons to pan left, pan right, pan up or pan down. Other selections that may be available on the navigation palette include buttons to alter the transparency of either the image 802 or the underground facility locate marks.

The status bar 850 may display information about the map control, such as the coordinates of the subject area, the coordinates of a cursor or stylus in relation to the image 802 and the image scale. The menu bar 860 may include an operating system element that allows a user to access commands, such as exiting the application, selecting what palettes or panels to display or accessing online help.

The service grid 870 is shown as an exemplary "floating" window to show how the user interface for the screen 800 may operate in a typical operating system environment. The service grid 870 or any of the other graphical elements described in relation to screen 800 may be in a fixed or floating orientation. As underground facility locate marks are drawn on the map control 810, they may appear in a list in the service grid 870. Thus, the user may edit the properties of an underground facility shape using the service grid 870, as well as by selecting the shape in the map control 810. The service grid may include properties, such as the type, length, circumference and material of the marked underground facility.

An electronic manifest of underground facility locate marks may serve several purposes. For example, the electronic manifest may provide significant improvements in accuracy and save time for the locate technician. Manual sketching is time consuming and imprecise. For example, with manual sketching, the general geographic features of the dig area location, i.e., roads, sidewalks, landscaping, buildings and other landmarks, must be reproduced by the locate technician. Creation of an electronic manifest that includes drafting on retrieved aerial images may improve accuracy and eliminate drafting of these general geographic features.

Additionally, or alternatively, an electronic manifest of underground facility locate marks may provide a variety of data formats from a single user event. For example, electronic drafting creates data about the electronic manifest, which can be reviewed without viewing the image. The type of marked underground facilities can be determined based upon the existence of different colors or other coding schema, length of marks for each underground facility can be approximated and the existence and length of offsets detected. If available, the location of the marks can be cross-checked to the user's description or depiction of the area to be marked or excavated.

Additionally, or alternatively, an electronic manifest of underground facility locate marks may provide for easier dissemination and record-keeping. Electronic manifests can be associated with individual tickets and recalled electronically, avoiding the uncertainties and errors associated with manual filing systems. Furthermore, electronic manifests can be interrogated to ensure that the information recorded on the electronic manifest accurately comports with billing data or other information regarding the locate operation(s) performed.

Additionally, or alternatively, information from the electronic manifest regarding the distance between environmental landmarks and located underground facility locate marks may be used to verify subsequent locate operations or the accuracy of the electronic manifest. For example, if the information identifies an underground facility as running parallel to the curb at a distance of three meters, that information may be used to assess the accuracy or consistency of a subsequent locate operation at the same dig area or, upon inspection, the accuracy of the electronic manifest.

Additionally, or alternatively, information from the electronic manifest regarding the number and types of underground facilities may be used to estimate the scope of a subsequent locate operation to be performed at a dig area. For example, a large number of underground facilities may be indicative of an extensive (i.e., time-consuming) locate operation.

Additionally, or alternatively, information from the electronic manifest may be used by a quality control supervisor and/or damage inspector to verify the accuracy of the underground facility locate marks. For example, if the user who performed a locate operation indicated that an underground facility runs parallel to a driveway at a distance of two meters, then the quality control supervisor or damage inspector may use this information to verify whether the marks properly reflected the actual location of the underground facilities present within the dig area. In addition, information from the electronic manifest may be used to train a user and/or to perform quality control relating to a user's work.

Aspects of the present disclosure as described herein enable retrieving from a database the appropriate aerial image of a specific geographic location or dig area, wherein locate operations are to be conducted for underground facilities. The user may draft, on the retrieved image, a variety of features, including but not limited to (1) the type of underground facilities marked using an appropriate color or other coding schema, (2) the number of underground facilities marked within the dig area, (3) the approximate geographic location of each set of underground facility locate marks, and (4) the appropriate environmental landmark offsets for each set of underground facility locate marks. The combination of the retrieved image and additional information drafted by the user may be saved in a variety of formats as an electronic manifest. Other information regarding the specific geographic location of the locate marks and environmental landmarks may be incorporated into the electronic manifest using direct input from GPS-enabled positioning tools and the like.

The foregoing description is not intended to be exhaustive or to limit the description to the precise form disclosed. Modifications and variations are possible in light of the above disclosure or may be acquired from practice of the present disclosure.

For example, certain information was described as being presented visually on a screen of user device 210. In other implementations, this information may be audibly provided to the user. In addition, particular information was described as being input via an input device 340, such as a screen of user device 210. In other implementations, this information may be provided in other ways, such as by receiving inputs via input keys and/or buttons, by recognizing speech of the user or by monitoring a condition of the user. More particularly, the input device 340 may be capable of capturing signals that reflect a user's intent. For example, the input device 340 may include a microphone that can capture a user's intent by capturing the user's audible commands. Alternatively, the input device 340 may interact with a device that monitors a condition of the user, such as eye movement, brain activity or heart rate.

As another example, certain components, such as user device 210 and central server 220 were described as using an image cache. In other implementations, user device 210 and/ or central server 220 may communicate with an image server (such as imager server 230) in real-time, so that no image cache may be required. In still other implementations, the user device 210 may, for example, communicate in real time with the central server 220.

As another example, it should be noted that the features of the present disclosure can be utilized using digitized or scanned hand written manifests featuring, for example, a grid or graphed layout of the locate, landmarks, the presence of underground facilities and the like.

As a further example, data and metadata including, but not limited to, time data, weather, humidity, brightness/darkness, and the like, which are collected according to the present disclosure can be quickly and efficiently interrogated, categorized, audited and delivered to a user, locate technician or third party.

As yet another example, it should be noted that reference within the present disclosure to a GPS-enabled device is not limited to GPS systems only and that any global navigation satellite system or other system that provides geo-spatial positioning may be used in implementations of the present disclosure.

In addition, while a series of blocks has been described with regard to FIG. 6, the order of the blocks may be modified in other implementations. Further, non-dependent blocks may be performed in parallel.

It will be apparent that aspects, as described above, may be implemented in many different forms of software, firmware, and hardware in the implementations illustrated in the figures. The actual software code or specialized control hardware used to implement these aspects is not limiting of the description provided herein. Thus, the operation and behavior of the aspects were described without reference to the specific software code; it being understood that software and control hardware can be designed to implement the aspects based on the description herein.

Even though particular combinations of features are recited in the claims and/or disclosed in the specification, these combinations are not intended to limit the present disclosure. In fact, many of these features may be combined in ways not specifically recited in the claims and/or disclosed in the specification.

No element, act or instruction used in the present application should be construed as critical or essential to the present disclosure unless explicitly described as such. In addition, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method for generating a searchable electronic record of a locate operation performed by a locate technician, the locate operation comprising identifying, using at least one physical locate mark, a presence or an absence of at least one underground facility within a dig area, wherein at least a portion of the dig area may be excavated or disturbed during excavation activities, the method comprising:
A) electronically receiving an aerial image of a geographic area comprising the dig area, at least a portion of the received aerial image being displayed on a display device;
B) adding to the displayed aerial image at least one digital representation of the at least one physical locate mark, applied to ground, pavement or other surface by the locate technician during the locate operation, so as to generate a marked-up digital image including the at least one digital representation of the at least one physical locate mark; and
C) electronically transmitting and/or electronically storing the searchable electronic record of the locate operation, wherein the searchable electronic record comprises the marked-up digital image and a data set, and wherein the data set comprises:
a set of geographic points along a marking path of the at least one underground facility, the set of geographic points including geographical coordinates corresponding to the at least one physical locate mark;
a property address associated with the at least one physical locate mark;
a timestamp indicative of when the locate operation occurred;
a name of the locate technician;
a name of a company responsible for performing the locate operation; and
a ticket number associated with the locate operation.

2. The method of claim 1, wherein B) comprises:
adding, via a user input device associated with the display device, the at least one digital representation of the at least one physical locate mark to the displayed aerial image, so as to generate the marked-up image.

3. The method of claim 2, wherein the user input device comprises a stylus.

4. The method of claim 2, wherein the user input device comprises a touch screen.

5. The method of claim 1, wherein B) comprises:
B1) electronically receiving location information regarding an identified location of the at least one physical locate mark; and
B2) adding to the displayed aerial image the at least one digital representation of the at least one physical locate mark, based at least in part on the location information received in B1).

6. The method of claim 5, wherein the location information includes geographic coordinates provided by a GPS-enabled device.

7. The method of claim 6, wherein the GPS-enabled device is a marking device configured to apply the at least one physical locate mark to the dig area.

8. The method of claim 7, wherein the marking device is a paint wand.

9. The method of claim 6, wherein the GPS-enabled device is a combined locating/marking device configured to both identify an underground facility in the dig area and apply the at least one physical locate mark to the dig area.

10. A non-transitory computer-readable medium encoded with instructions that, when executed on at least one processing unit, perform a method of generating a searchable electronic record of a locate operation performed by a locate technician, the locate operation comprising identifying, using at least one physical locate mark, a presence or an absence of at least one underground facility within a dig area, wherein at least a portion of the dig area may be excavated or disturbed during excavation activities, the method comprising:
electronically transmitting and/or electronically storing a searchable electronic record of the locate operation, wherein the searchable electronic record comprises:
(i) a marked-up digital image comprising:
a digital image of a geographic area comprising the dig area, and
at least one digital representation, marked on the digital image of the geographic area, of the at least one physical locate mark applied to ground, pavement or other surface by the locate technician during the locate operation, and (ii) a data set associated with the marked-up digital image, the data set comprising:

a set of geographic points along a marking path of the at least one underground facility, the set of geographic points including geographical coordinates corresponding to the at least one physical locate mark;

a property address associated with the at least one physical locate mark;

a timestamp indicative of when the locate operation occurred;

a name of the locate technician;

a name of a company responsible for performing the locate operation; and a ticket number associated with the locate operation.

11. The computer-readable medium of claim 10, wherein the digital image comprises an identification of an environmental landmark.

12. The computer-readable medium of claim 11, wherein the digital image comprises an aerial image.

13. The computer-readable medium of claim 10, wherein the geographical coordinates comprise GPS coordinates.

14. The computer-readable medium of claim 10, wherein the data set comprises an underground facility identifier field that uniquely identifies a type of underground facility marked by the at least one physical locate mark.

15. The computer-readable medium of claim 10, wherein the data set comprises an underground facility location field comprising a set of geographic coordinates corresponding to the at least one physical locate mark.

16. The computer-readable medium of claim 10, wherein the data set comprises an environmental landmark identifier field comprising a type of an environmental landmark identified by the locate technician.

17. The computer-readable medium of claim 16, wherein the data set comprises an environmental landmark location field comprising geographic coordinates corresponding to a location of the environmental landmark.

18. The computer-readable medium of claim 10, wherein the data set comprises an underground facility owner field comprising an name of the owner or operator of an underground facility identified by the locate technician.

19. The computer-readable medium of claim 10, wherein the data set comprises a marking method field comprising an indication of a marking method used to generate the at least one physical locate mark.

20. An apparatus for facilitating generation of a searchable electronic record of a locate operation performed by a locate technician, the locate operation comprising identifying, using at least one physical locate mark, a presence or an absence of at least one underground facility within a dig area, wherein at least a portion of the dig area may be excavated or disturbed during excavation activities, the apparatus comprising:

a communication interface;

a display device;

a memory to store processor-executable instructions; and a processing unit coupled to the communication interface, the display device, and the memory, wherein upon execution of the processor-executable instructions by the processing unit, the processing unit:

controls the communication interface and/or the memory to electronically transmit and/or electronically store a searchable electronic record of the locate operation, wherein the searchable electronic record comprises:

(i) a marked-up digital image comprising:

a digital image of a geographic area comprising the dig area, and at least one digital representation, marked on the digital image of the geographic area, of the at least one physical locate mark applied to ground, pavement or other surface by the locate technician during the locate operation, and (ii) a data set associated with the marked-up digital image, the data set comprising:

a set of geographic points along a marking path of the at least one underground facility, the set of geographic points including geographical coordinates corresponding to the at least one physical locate mark;

a property address associated with the at least one physical locate mark;

a timestamp indicative of when the locate operation occurred;

a name of the locate technician;

a name of a company responsible for performing the locate operation; and a ticket number associated with the locate operation.

21. The apparatus of claim 20, wherein the apparatus further comprises a user input device, and wherein the processing unit receives from the user input device inputs identifying a geographic location of the at least one physical locate mark.

22. The apparatus of claim 21, wherein the user input device includes one of a stylus and a mouse.

23. The apparatus of claim 21, wherein the user input device includes one of a keyboard, a keypad, a touchpad, and a touch screen.

24. The apparatus of claim 21, wherein the user input device includes one of a microphone to capture audible commands, and a camera.

25. The apparatus of claim 20, wherein the processing unit controls the communication interface to receive from a marking device input identifying a geographic location of the at least one physical locate mark.

26. The apparatus of claim 25, wherein the input from the marking device comprises geographical coordinates of the at least one physical locate mark.

27. The apparatus of claim 26, wherein the geographical coordinates comprise GPS coordinates.

28. The apparatus of claim 20, in combination with the marking device, wherein the marking device comprises a GPS-enabled device.

29. The combination of claim 28, wherein the GPS-enabled device is a GPS-enabled paint wand.

30. The combination of claim 28, wherein the GPS-enabled device is a combined locating/marking device configured to both identify an underground facility in the dig area and apply the at least one physical locate mark to the dig area.

* * * * *

UNITED STATES PATENT AND TRADEMARK OFFICE
CERTIFICATE OF CORRECTION

PATENT NO. : 8,340,359 B2  
APPLICATION NO. : 12/208846  
DATED : December 25, 2012  
INVENTOR(S) : Steve Nielsen Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 876 days.

Signed and Sealed this  
Sixth Day of January, 2015

Michelle K. Lee  
*Deputy Director of the United States Patent and Trademark Office*